United States Patent [19]
Hiraiwa

[11] Patent Number: 5,930,352
[45] Date of Patent: Jul. 27, 1999

[54] COMMUNICATION TERMINAL APPARATUS

[75] Inventor: Akihiro Hiraiwa, Kanagawa, Japan

[73] Assignee: Sony Corporation, Tokyo, Japan

[21] Appl. No.: 08/632,441

[22] PCT Filed: Aug. 31, 1995

[86] PCT No.: PCT/JP95/01742

§ 371 Date: Jun. 3, 1996

§ 102(e) Date: Jun. 3, 1996

[87] PCT Pub. No.: WO96/07262

PCT Pub. Date: Mar. 7, 1996

[30] Foreign Application Priority Data

Aug. 31, 1994 [JP] Japan .................................. P6-232408

[51] Int. Cl.⁶ .................................................. H04M 1/00
[52] U.S. Cl. ......................... 379/387; 379/368; 379/433; 379/428
[58] Field of Search .................................. 379/433, 368, 379/387, 428

[56] References Cited

U.S. PATENT DOCUMENTS

| | | | |
|---|---|---|---|
| 4,427,847 | 1/1984 | Hofmann et al. | 348/552 |
| 5,007,081 | 4/1991 | Schmuckal et al. | 379/354 |
| 5,504,813 | 4/1996 | Takasaki | 379/433 |

FOREIGN PATENT DOCUMENTS

| | | | |
|---|---|---|---|
| 58-111544 | 7/1983 | Japan | H04B 1/38 |
| 63-38438 | 3/1988 | Japan | H04M 1/00 |
| 3213035 | 9/1991 | Japan | H04M 1/00 |
| 574051 | 10/1993 | Japan | H04M 1/03 |

*Primary Examiner*—Ahmad F. Matar
*Assistant Examiner*—Shih-wen Hsieh
*Attorney, Agent, or Firm*—Jay H. Maioli

[57] ABSTRACT

A communication terminal apparatus has a microphone module movable between an on-hook position adjacent to a main shell and a call position distanced from the main shell. The communication terminal apparatus also includes a transmitter/receiver circuit for modulating and transmitting an output signal from the microphone module, and demodulating and reproducing an input signal, a speaker unit for receiving the demodulated input signal and emitting it as an audible sound, a detector mechanism for detecting the position of the microphone module, and a controller device responsive to a detection signal from the detector mechanism for controlling the input and output of the voice signals. The controller device mutes the output signal of the microphone module upon the detector mechanism detecting that the microphone module is located at the on-hook position. Hence, the muting action is activated and deactivated by the movement of the microphone module. When the muting action of the muting means is activated, the transmitter/receiver circuit generates and transmits a hold signal to a calling party at the other end of the line for indicating that the line remains connected.

12 Claims, 30 Drawing Sheets

FIG.6(A)

Input dial NO

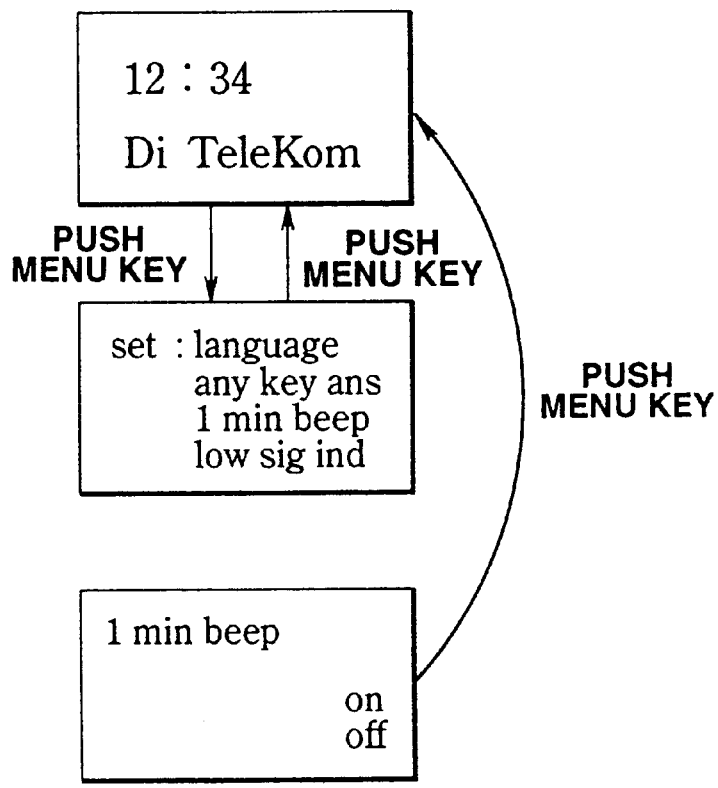

PUSH CLEAR KEY

PUSH CLEAR KEY

↓ CLICK KEY

↓ SCROLL & CLICK KEY

↓ CLICK KEY

↓ CLICK & HOLD KEY

1 Robert
2 George
3 Sally
4 Ilia
5 Jack
 .
 .

9 Nick
Alice
Bob
Cane
Dick
Ellis
 .
 .

Yang

```
2  George
3  Sally
4  Ilia
5  Jack
```

PUSH "7" KEY

FIG.18 (B)

```
6  Mike
7  Kate
8  Bill
9  Boowy
```

• PRESS AND HOLD KEY
• PRESS SEND KEY
• HOLD "7" KEY

FIG.18 (C)

```
7
Kate
981751431531
```

FIG.19 (A)

```
3   Mary
4   John
5   Ellis
6   Bob
```

↓ CLICK

FIG.19 (B)

```
5
Ellis
0403769233372
```

↓ KEY UP

FIG.19 (C)

```
3   Mary
4   John
5   Ellis
6   Bob
```

FIG.20 (A)

```
1  Mike
2  Sarah
3  Ellis
4  Holly

5  Jane
6  Peter
7  Yang
8  Lily
6  Betty
    ⋮
87 Alice
88
89
    ⋮
```

FIG.20 (B)

```
new regist
1  Mike
2  Sarah
3  Ellis
```
↓ CLICK

FIG.20 (C)

```
Input Name

Bob__
```
↓ CLICK

FIG.20 (D)

```
87  Alice
88  Bob
89
90
```

SCROLL

CLICK

CLICK

CLICK

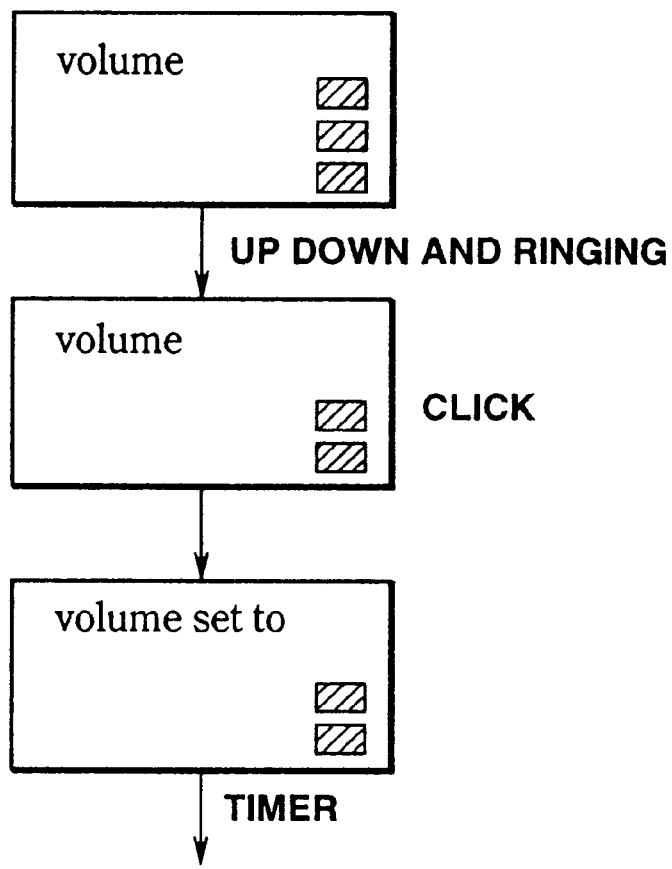

COMMUNICATION TERMINAL APPARATUS

TECHNICAL FIELD

The present invention relates to a communication terminal apparatus, and more particularly to a communication terminal apparatus having a speech input device which includes a microphone and is arranged for movement between an on-hook position on a main shell and a call position, where a call is enabled, distanced from the on-hook position, and a controller for detecting the position of the speech input device relative to the main shell and using a detection signal to control the input and output of a speech.

BACKGROUND ART

As portable radio phone systems have widely been in service, a variety of multi-function communication terminal apparatuses are now available for communications in the systems. Such a multi-function communication terminal apparatus offers auto-dial or speed call for selecting one from a plurality of telephone numbers stored in a memory installed in the main shell and dialing it automatically, as well as registering any name and number to a list of telephone numbers in the memory.

The communication terminal apparatus for use with a portable radio phone system is of a hand-held type which is essentially required for having minimum size and weight. For the purpose, each of the conventional terminal apparatuses is equipped with a sheet type of dial keys, a highly advanced battery(s), and a state-of-art integrated circuit which all are light weight.

As every communication terminal apparatus has a transmitter and a receiver spaced from each other by a distance between the mouth and the ear, its oversize depends on the distance between the transmitter and the receiver. Commonly, the transmitter is spaced by 13.5 cm to 14.3 cm from the receiver and at an angle of 23.3 to 13.4 to the same. For minimizing the overall size of the apparatus while satisfying those requirements, the transmitter is separated in structure from the receiver; the two, transmitter and receiver, blocks of the apparatus are arranged foldable to each other. As the transmitter and receiver of the communication terminal apparatus remain folded down when not used, their dimensions are minimized to a so-called pocket size. When a call is made, the transmitter and receiver are opened up to the mouth-to-ear distance.

DISCLOSURE OF THE INVENTION

It is an object of the present invention to provide a communication terminal apparatus having a main shell minimized in size and weight and adapted for performing multiple functions.

It is another object of the present invention to provide a communication terminal apparatus having multi-function controls without increasing the number of control keys, thus minimizing the overall size of its main shell.

It is a further object of the present invention to provide a communication terminal apparatus improved in the operability by controlling the input and output of voice signals during a call with the use of movements of a transmitter module which acts as a speech input means and is arranged movable relative to a main shell.

It is a still further object of the present invention to provide a communication terminal apparatus capable of informing a calling party at the other end of the line that the line remains connected while a voice signal is being muted, thus ensuring smooth transmission and receiving actions.

It is a still further object of the present invention to provide a communication terminal apparatus capable of muting voice signals of a transmitter or receiver module during a call to prevent transmission or receiving of unwanted voice sounds thus increasing the effectiveness of transmission and receiving actions.

For achievement of the above object, a communication terminal apparatus according to the present invention comprises: a speech input means arranged movable from a position adjacent to a main shell to a position distanced from the main shell for calling; a speech output means for reproducing a received signal as an audible sound; a detector means for detecting the position of the speech input means; and a controller means responsive to a detection signal from the detector means for controlling the input and output of a voice signal.

The controller means includes a muting means responsive to the detection signal from the detector means for muting a signal output of the speech input or output means. The muting means performs a muting action when the detection signal from the detector means indicates that the speech input means is located at the position adjacent to the main shell.

The communication terminal apparatus of the present invention further comprises a means for generating a hold signal in response to the muting action of the muting means. The hold signal produced by the generating means is transmitted to a calling party at the other end of the line.

The speech input means of the communication terminal apparatus comprises an arm pivotably mounted to the main shell for movement between an on-hook position adjacent to the main shell and a call position distanced from the same, and a microphone unit mounted to the arm.

The detector means comprises a detection target made of a magnet and mounted to either the arm of the speech input means or the main shell, and a detector composed of a Hall device and mounted to the other.

Another communication terminal apparatus according to the present invention comprises: a microphone module arranged movable between an on-hook position adjacent to a main shell and a call position distanced from the main shell; a transmitter/receiver means for modulating and transmitting an output signal from the microphone module, and modulating and reproducing an input signal; a speaker module for emitting an audible sound corresponding to the demodulated input signal from the transmitter/receiver means; a detector means for detecting the position of the microphone module; and a controller means responsive to a detection signal from the detector means for controlling the input and output of the voice signals. The controller means includes a muting means for muting the output signal of the microphone module upon the detector detecting that the microphone module is located at the on-hook position.

Also, the communication terminal apparatus further comprises a means for generating in response to the muting action of the muting means a hold signal which is then transmitted to the transmitter/receiver means and forwarded from the same.

Other objects and advantages of the present invention will be more apparent from the following detailed description in conjunction with the accompanying drawings.

BRIEF DESCRIPTION OF THE DRAWINGS

FIG. 6, consisting of parts 6(A), 6(B) and 6(C), is a series of illustrations explaining shift of one font to another due to the size of input characters.

FIG. 7, consisting of parts 7(A), 7(B) and 7(C), is a series of illustrations explaining shift of a display screen with a menu key.

FIG. 17 is a diagram showing a row of character names in the telephone number list.

FIG. 18, consisting of parts 18(A), 18(B) and 18(C) is a series of illustrations showing steps of retrieving a data with numeral keys.

FIG. 19, consisting of parts 19(A), 19(B) and 19(C), is a series of illustrations explaining return from a detailed data screen to a list screen.

FIG. 20, consisting of parts 20(A), 20(B), 20(C) and 20(D), is a series of illustrations showing a procedure of registering a name in the telephone number list screen.

FIG. 27, consisting of parts 27(A), 27(B) and 27(C), is a series of illustrations showing a detailed data screen for volume setting.

BEST MODES FOR CARRYING OUT THE INVENTION

Preferred embodiments of a communication terminal apparatus according to the present invention will be described referring to the accompanying drawings.

Figure 1:
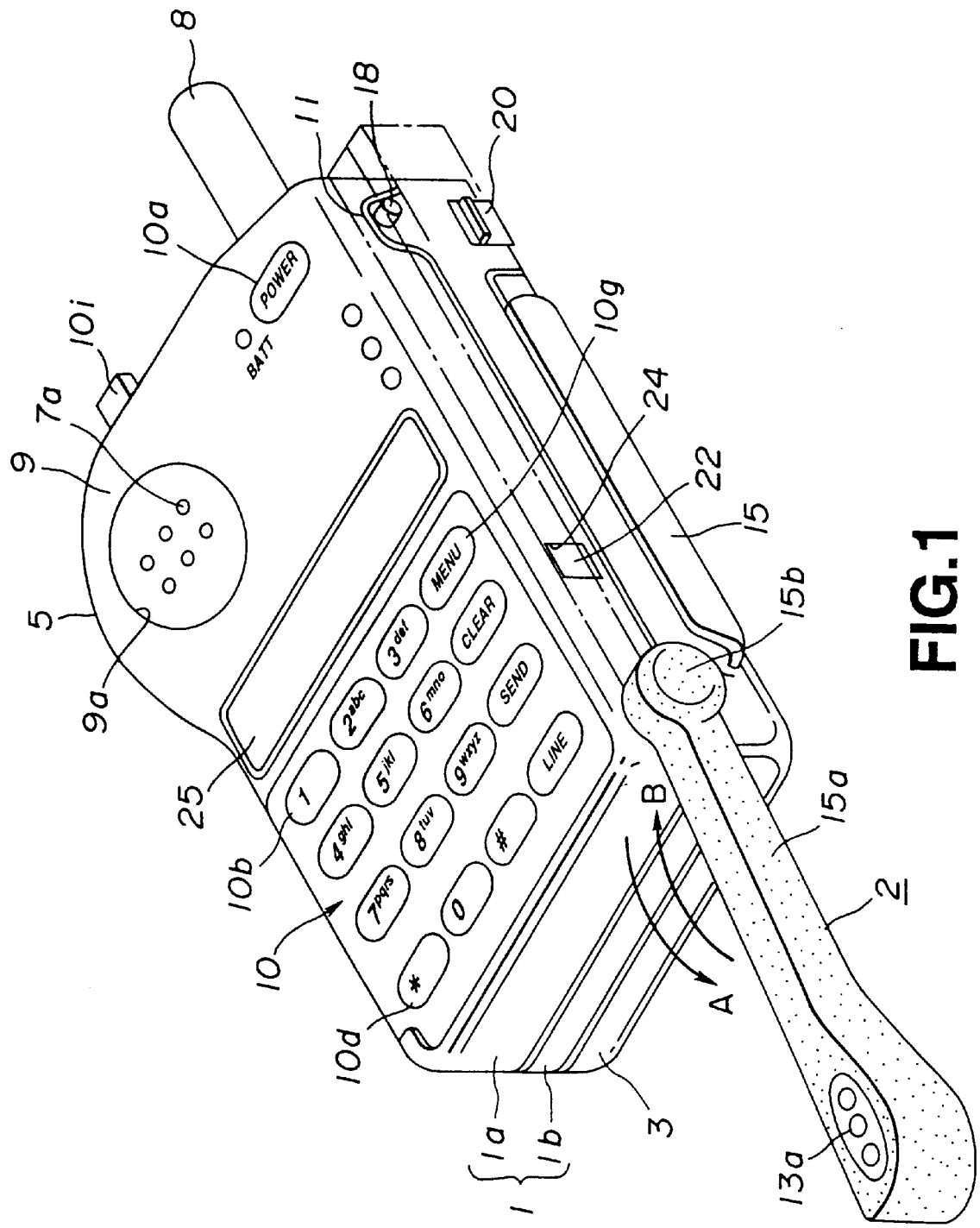
FIG. 1 is a partially broken perspective view showing a transmitter turned open from a main shell to a call position.
Figure 2:
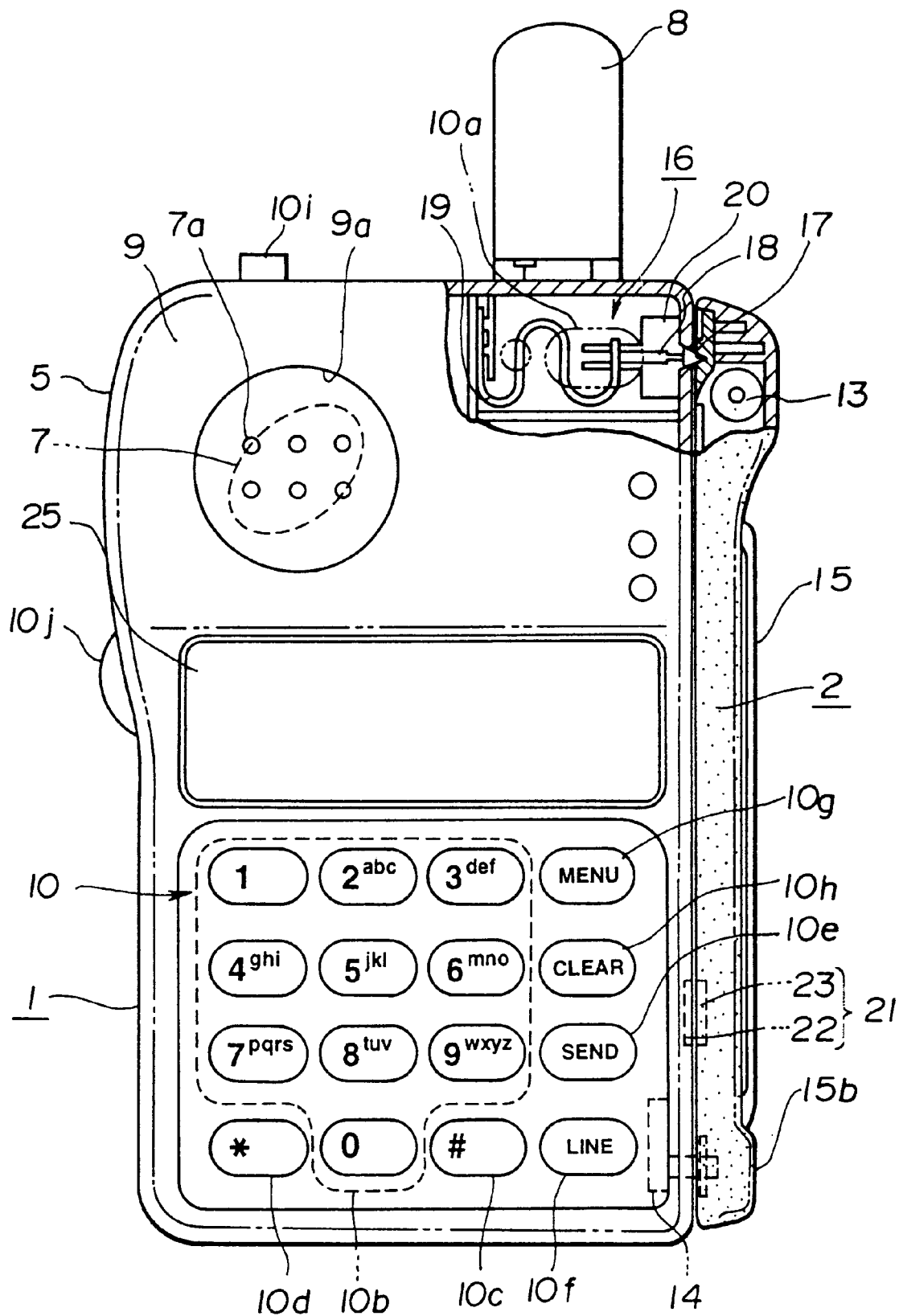
FIG. 2 is a plan view of the transmitter held on the main shell.

The communication terminal apparatus of the present invention is tailored to a hand-held size, as shown in FIGS. 1 and 2, comprising a main shell 1, a transmitter 2 pivotably having a microphone unit 13 therein and mounted to one side of the main shell 1 for serving as a speech input unit, and a battery box 3 arranged integral with the main shell 1 for accommodating therein a set of battery cells.

The main shell 1 consists mainly of two, upper and lower, halves 1a and 1b made of a synthetic resin material and joined to each other forming a rectangular housing. Installed in the main shell 1 are a speaker unit 7 incorporating a speaker assembly, and a printed circuit board carrying thereon speech circuitry components, dial circuitry components, communication circuitry components, and power supply components.

The side of the main shell 1 which acts as an on-hook station for the transmitter 2 and will be explained later in more detail is substantially flattened at surface extending length wise. A telescopic antenna 8 is mounted to a top side of the main shell 1 which is at a right angle to the transmitter 2 mounting side. An arcuately projecting, bulged facet 5 is provided on the upper end of a side extending lengthwise of the main shell 1 opposite to the transmitter mounting side, as shown in FIGS. 1 and 2.

The communication terminal apparatus of the present invention including the transmitter 2 and the antenna 8 at one side and the arcuate bulged facet 5 at the other side is designed so that it can be held securely by the left hand of a user with its bulged facet 5 situated under a proximal portion of the thumb and its transmitter 2 and antenna 8 gripped by the fingers.

The speaker unit 7 is embedded in an arcuately projecting, bulged speaker facet 9 provided adjacent to the bulged facet 5 on the front side of the main shell 1, as shown in FIGS. 1 and 2. More specifically, the speaker unit 7 is directly mounted on the printed circuit board installed in the main shell 1. The speaker facet 9 has a round recess 9a for accepting and easing a part of the ear of the user. A plurality of acoustic apertures 7a are arranged in the bottom of the recess 9a of the facet 9.

The front side of the main shell 1 has an input device 10 mounted thereon beneath the speaker 7 facet 9. The input device 10 comprises an array of operating keys including a power key 10a, ten, 0 to 9, numeral keys 10b, a "#" key 10c, a "*" key 10d, a "SEND" key 10e, an "END" key 10f, a "MENU" key 10g, and a "CLEAR" key 10h. The keys 10a to 10h are sheet switches electrically connected by their respective flexible cables to the printed circuit board in the main shell 1.

Also, a recording key 10i which is a member of the input device 10 is mounted on the top side of the main shell 1 to be opposite to the antenna 8. The input device 10 further includes a rotary key 10j mounted beneath the bulged facet 5 on the other side of the main shell 1.

The transmitter 2 mounted to the on-hook side of the main shell 1 comprises an arm 12 extending lengthwise and substantially equal in length to the main shell 1. The microphone unit 13 is mounted to the distal end of the arm 12. The arm 12 is made of an elastic material, e.g. rubber, in which the microphone 13 is accommodated. The arm 12 of the elastic material has a reinforcement member such as a metal wire spring implanted therein for ease of the recovery from adverse deflection or twist. A plurality of voice pickup apertures 13a are provided at the microphone 13 in the arm 12.

The mounting of the transmitter 2 to the on-hook side of the main shell 1 is by means of a pivotal support 14 secured to the lower end of the on-hook side of the main shell 1 for pivotal movement of the distal end of the arm 12. In action, the transmitter 2 turns about the pivotal support 14 in opposite directions denoted by the arrows A and B of FIG. 1. In other words, the transmitter 2 can move from its on-hook position on the on-hook side of the main shell 1 where it extends lengthwise as shown in FIG. 2 to its call position where its microphone 13 is distanced from the main shell 1 as shown in FIG. 1 for making or receiving a call.

In addition, a holder 15 is mounted as a member of the on-hook station on the on-hook side of the main shell 1 for holding the transmitter 2 which has been turned to the on-hook position, extending outwardly from the lower half 6 of the main shell 1. The holder 15 has an L shape in cross section so that it can accept the transmitter 2 through its opening at the front of the main shell 1 and detachably retain it at the on-hook position. As its extended arm 12 is held in the holder 15, the transmitter 2 can be protected at the on-hook position.

The transmitter 2 it when comes to its on-hook position in the holder 15 is engaged and locked with a lock mechanism 16 mounted to the upper end of the on-hook side of the main shell 1. As best shown in FIG. 2, the lock mechanism 16 comprises a lock pin 18 arranged extending outwardly from the on-hook side of the main shell 1 for engaging with a recess 17 provided in the main shell 1 side of the transmitter 2, a leaf spring 19 provided for urging the lock pin 18 to extend outwardly from the on-hook side of the main shell 1, and an actuator 20, shown in FIG. 1, mounted to the on-hook side of the main shell 1 for disengaging the lock pin 18 from the recess 17 of the transmitter 20 when being pressed inwardly against the urging force of the leaf spring 19. As the transmitter 2 is locked with the lock mechanism 16, it remains securely retained at its on-hook position in the holder 15 and prevented from abrupt removal ensuring error-free handling.

For use, the transmitter 2 is released from the lock mechanism 16 by sliding the actuator 20 to press the lock pin 18 inwardly of the main shell 1 as resisting against the urging force of the leaf spring 19. As the result, the transmitter is turnable about the pivot support 14 in the direction denoted by the arrow A of FIG. 1. It is a good idea that the pivot support 14 is provided with an urging means such as a torsion spring for urging the transmitter 2 in the direction of the arrow A. In this case, the transmitter 2 is automatically turned in the direction of the arrow A upon having been released from the lock mechanism 16 and stays in its call position off the main shell 1, as shown in FIG. 1.

Although the pivot support 14 is provided with the spring which remains urging the transmitter 2 to depart from the holder 15 of the main shell 1 in the direction of the arrow A shown in FIG. 1, the transmitter 2 at the on-hook position is securely locked with the lock mechanism 16 and will not escape from the on-hook station.

A detector 21 is provided between the main shell 1 and the transmitter 2 for detecting whether the transmitter 2 is at the on-hook position on the main shell 1 or at the call position with its microphone unit 13 distanced from the main shell 1. The detector 21 comprises a Hall device 22 mounted to the on-hook side of the main shell 1 for facing the transmitter 2 at the on-hook position, and a magnetic member 23 mounted to the main shell 1 side of the transmitter 2 for acting as an object to be detected by the Hall device 22 when the transmitter 2 is at its on-hook position. More particularly, the Hall device 22 is installed in the main shell 1 and exposed through an aperture 24 provided in the on-hook side of the main shell 1 to the outside. The magnetic member 23 is made of a magnetic material or sheet and bonded by e.g. an adhesive to the main shell 1 side of the arm 12 of the transmitter 2.

When the transmitter 2 is retained at its on-hook position in the holder 15 of the main shell 1, a magnetic flux of its magnetic material 23 is detected by the Hall device 22 of the detector 21 which in turn produces a detection signal indicative of the presence of the transmitter 2 at the on-hook station. When the transmitter 2 is turned and removed from the holder 15, the Hall device 22 of the detector 21 fails to detect the magnetic flux of the magnetic material 23 and generates another detection signal indicating that the transmitter 2 has been removed from the on-hook station on the main shell 1 and its microphone unit 13 is spaced from the main shell 1.

The detector 21 for detecting the presence of the transmitter 2 on the main shell 1 may be composed of optical detecting means instead of the magnetic detecting means of the description. For example, an emitter/receiver combination device is installed in the main shell 1 while a reflector is mounted on the transmitter 2. The presence of the transmitter 2 on the main shell 1 is thus detected by examining whether or not a beam of light emitted from the emitter is reflected on the reflector of the transmitter 2 and received by the receiver.

In addition to the input device or key control 10 including the operating keys 10a to 10h, a display 25, e.g. an LCD, is provided on substantially a center region of the front side of the main shell 1 between the speaker facet 9 of the speaker 7 and the key control 10, as shown in FIGS. 1 and 2.

The main shell 1 contains a central processing unit (CPU) 31 mounted on the printed circuit board for serving as a controller.

Figure 3:
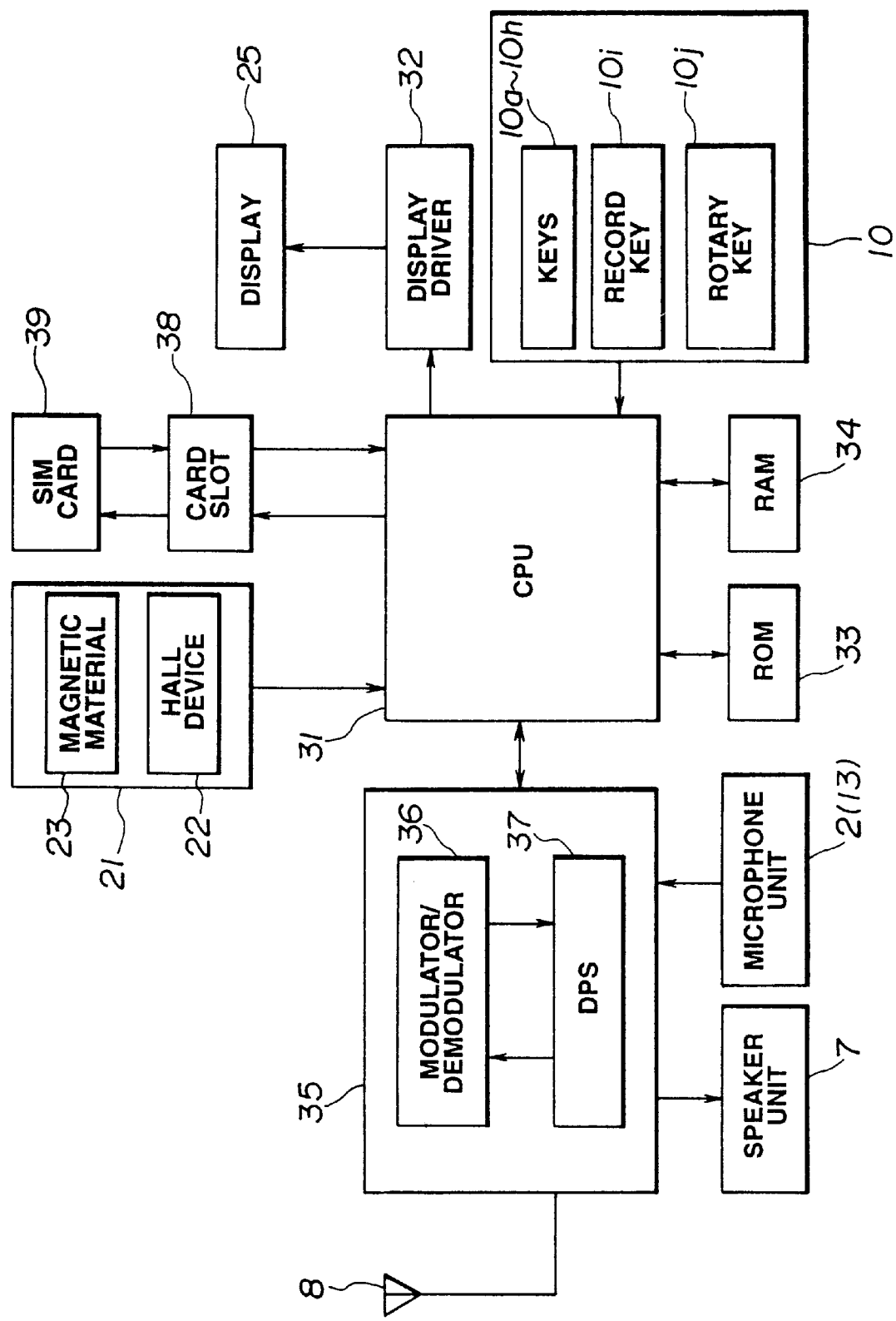
FIG. 3 is a block diagram of a circuitry arrangement installed in a communication terminal apparatus.

The CPU 31 drives the display 25 through a display driver circuit 32 for displaying a desired font of information entered from the key control 10, as shown in FIG. 3.

The CPU 31 is also loaded with the prescribed detection signal of the detector 21 indicating that the transmitter 2 is held in the holder 15 of the main shell 1 or that the same is turned away with its microphone unit 13 distanced from the main shell 1. The detection signal is used as a control signal for controlling the input control mechanism 10 and a transmitter/receiver circuit 35.

Programs stored in a ROM and data read from a RAM 34 are then supplied to the CPU 31. In turn, the CPU 31 performs an arithmetic operation according to the programs stored in the ROM 33 and/or data saved in the RAM 34.

The CPU 31 controls the action of the transmitter/receiver circuit 35 mounted on the printed circuit board of the main shell 1.

The transmitter/receiver circuit 35 controlled by the CPU 31 includes a modulator/demodulator circuit 36 for modulating a voice signal of speech sounds produced with the microphone 13 of the transmitter 2 to yield a transmission signal which is sent out through the antenna 8, and demodulating a received signal intercepted with the antenna 8 to reproduce a voice signal of the calling party which is then fed to the speaker 7. The transmitter/receiver circuit 35 also contains a digital signal processor (DSP) 37 responsive to the control signal from the CPU 31 for processing the voice signal from the microphone unit 13 before transmitting it to the modulator/demodulator circuit 36, and processing and transmitting the received signal from the modulator/demodulator 36 to the speaker 7. The DSP 37 also includes an amplifier circuit for amplifying the voice signals from the microphone unit 13 and the modulator/demodulator circuit 36, The DSP 37 is further equipped with a hold signal generator circuit responsive to the control signal from the CPU 31 for generating a hold signal when the communication terminal apparatus is busy. The hold signal generated in the hold signal generator circuit of the DSP 37 is then modulated by the modulator/demodulator circuit 36 and released through the antenna 8. The DSP 37 serves as a means for generating the hold signal.

The amplifier circuit for amplifying the voice signal from the microphone unit 13 and the voice signal to the speaker 7 may be provided separately of the DSP 37. More particularly, the amplifier circuit may be connected between the DSP 37 and the microphone unit 13 and between the DSP 37 and the speaker 7.

As shown in FIG. 3, the CPU 31 is connected to a card socket 36 to which a subscriber identity module (SIM) card 37 is inserted. Data of a subscriber is read from the SIM card 37 and used by the CPU 31 for performing a routine mode of control in the terminal apparatus.

Figure 4A:
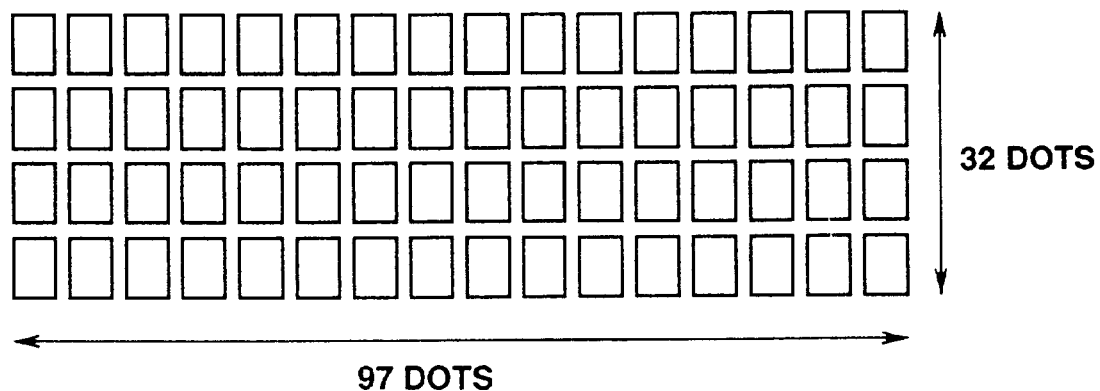
FIGS. 4(A) and 4(B) are schematic diagrams explaining a small font.
Figure 4B:
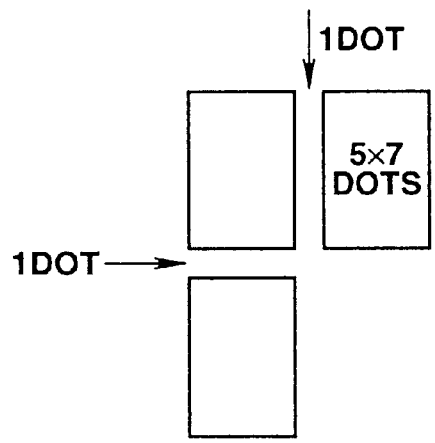
Figure 5A:
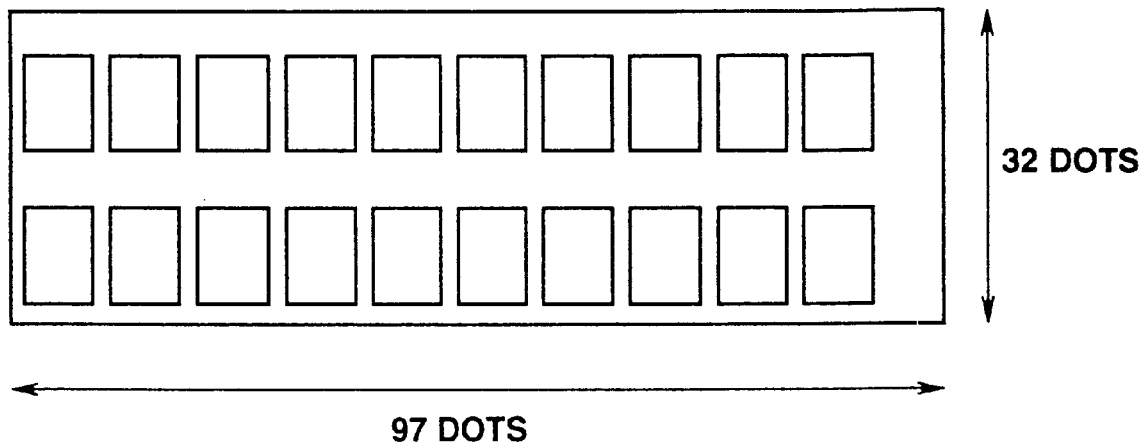
FIGS. 5(A) and 5(B) are schematic diagrams explaining a large font.
Figure 5B:
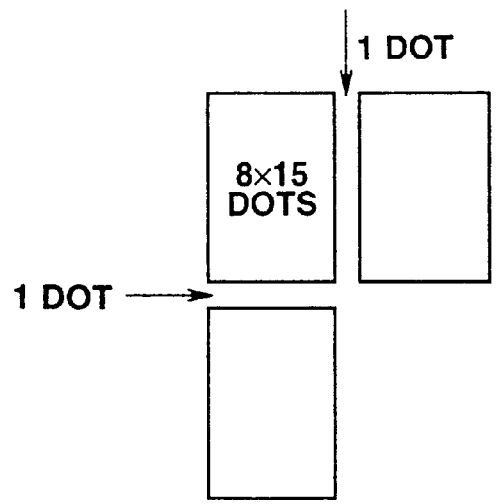

The display 25 of the embodiment is an LCD comprising a matrix of pixels, 32 rows by 97 columns, for display of two different fonts: a small font consisting of 5 dots high by 7 dots wide as shown in FIGS. 4(A) and 4(B) and a large font consisting of 15 dots high by 8 dots wide as shown in FIGS. 5(A) and 5(B). When the small font is selected, the display 25 exhibits up to 4 characters in vertical and 16 characters in horizontal. If the large font is used, the display 25 shows at best 2 characters in vertical and 10 characters in horizontal.

It is now noted that the large font is for displaying characters entered by the user while the small font is for displaying messages attributed to the terminal apparatus. It is however designed that if the total number of characters entered by the user exceeds a given number (preferably 20), its display is systematically shifted from the large font to the small font.

FIG. 6 illustrates an example of consecutive display screens appearing on the display 25. The display starts with showing beneath a message of small font characters, "input dial No", a group of large font characters entered by the user until the number of the input characters exceeds 10. If more than 10 of the large font characters are entered, 10 of them move to the upper row and eliminate the small font message and then, the eleventh and higher large font characters appear at the lower row. When the two, upper and lower, rows in the display 25 have been filled with 20 of the large font characters, all the large font characters are replaced by their corresponding small font characters at once.

As the font is automatically switched from large to small, the large font allows ease of viewing the display before it is replaced by the small font, whereby error reading or entering will be minimized. Even if a considerable number of small font characters are entered for bulky information, they are viewed on one screen of the display 25 and can be acknowledged with much ease.

The key control 10 will now be explained in more details referring to the functions of the control keys 10a to 10h on the front side of the main shell 1, the record key 10i on the top side, and the rotary key 10j on the other side.

The power key 10a of the key control 10 located near the top side of the main shell 1 is used for energizing the inner circuit in the main shell 1. The inner circuit is energized when the power key 10a is depressed once, and energized when the same is depressed again. If no personal identity number (PIN) is entered within 30 seconds after the energization of the circuit with the power key 10a, the CPU 31 detects no entry of the PIN and disconnects the inner circuit automatically. This permits energy saving in case of any unintentional energization.

The ten numeral keys 10b located on the front side of the main shell 1 are provided for entry of numbers and as well as alphabetical letters. The alphabetical letters are allocated to the eight, "2" to "9", keys excluding the "0" and "1" keys. For instance, a, b, and c are assigned to the "2" key and d, e, and f are assigned to the "3" key, and so on.

When the key is pressed once, the first of its three alphabetical letters is entered. When it is pressed twice, the second letter is input. When it is pressed three times, the third letter is entered. The numeral keys 10b are also used for selecting the number of a desired option on the screen. With a list of telephone numbers appearing on the display, hitting a target number key for a predetermined length of time, e.g. one second, results in initiating a call to a telephone number designated to the key. In other words, the numeral keys 10b provide a speed dialing or number-in-memory function.

The SEND key 10e is used for executing the call to the telephone number selected from the list of telephone numbers on the display and for reviewing a history of calls.

The end key 10f is provided for stopping the call. Also, the call is stopped when the transmitter 2 is turned back to the on-hook position on the main shell 1. When the transmitter 2 has been turned about the pivot support 14 from its call position in the direction of the arrow B shown in FIG. 1 and comes to the on-hook position in the holder 15 on the on-hook side of the main shell 1, its presence is detected by the detector 21 which in turn delivers a detection signal for terminating the call. More specifically, upon its Hall device 22 intercepting an intensity of magnetic flux generated by the magnetic material 23 of the transmitter 2, the detector 21 yields the detection signal indicative of the presence of the transmitter 2 at the on-hook station.

Figure 8A:
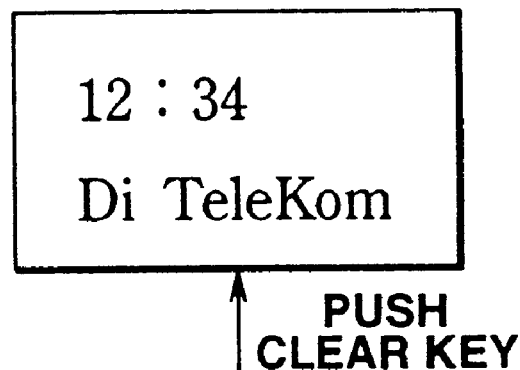
FIG. 8, consisting of parts 8(A), 8(B) and 8(C), is a series of illustrations explaining shift of a display screen with a clear key.
Figure 8B:
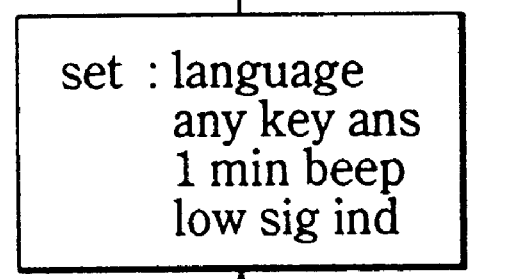
Figure 8C:
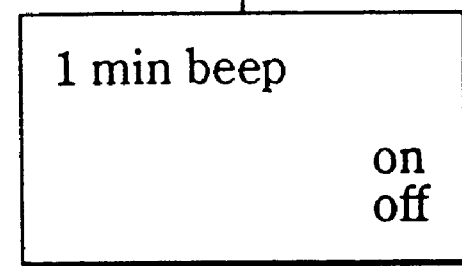

The menu key 10g is used for switching between a start screen and a menu screen on the display 25. For example, while the start screen appears on the display 25 as shown in FIG. 7(A), pressing of the menu key 10g shifts from the start screen to the menu screen shown in FIG. 7(B). Then, a scroll movement, which will be described later, allows the display 25 to access a screen shown in FIG. 7(C) like as turning to a new page. When the menu key 10g is pressed with the menu screen appearing, the display 25 instantly shifts to the start screen. The clear key 10h functions returning to the preceding screen or page as shown in FIG. 8.

Another function of the menu key 10g is to disable the key locking which inhibits the entry action of the main keys 10a to 10h, record key 10i, and rotary key 10j of the key control 10.

The record key 10i is used for recording and playing back a communication in progress. For ease of the control by one hand, the record key 10i is located on the top side of the main shell 1 away from the on-hook side where the transmitter 2 is retained.

Finally, the function of the rotary key 10*j* as an input means is explained. As shown in FIG. 2, the rotary key 10*j* is located in the proximal region of the bulged facet 5 on the other side of the main shell 1 opposite to the on-hook side where the transmitter 1 is held so that it can be manipulated like the record key 10*i* by the same hand which holds the main shell 1.

Figure 9:
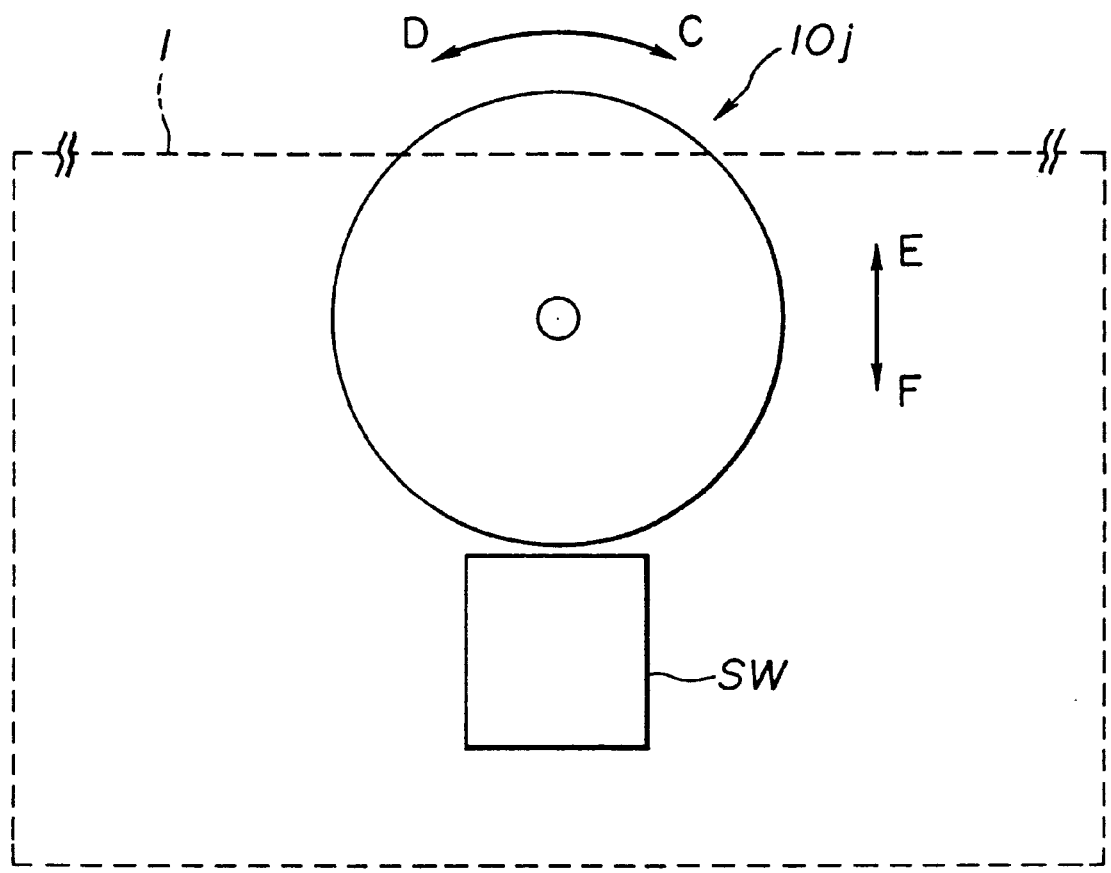
FIG. 9 is a schematic plan view showing roughly the construction of a rotary key.

The rotary key 10*j* is capable of being controlled in circumferential directions and radial directions respectively. As shown in FIG. 9, the rotary key 10*j* comprises a disk assembly for rotating about a rotary shaft O in the two circumferential directions denoted by the arrows C and D and also acting as a rotary encoder, a slide plate (not shown) for sliding in the radial directions denoted by the arrows E and F, and a slide switch SW. The slide plate and slide switch SW remain urged in the E direction.

The rotary shaft O is fixedly mounted to the slide plate so that when the rotary key 10*j* is pressed in the F direction, its disk assembly or rotary encoder moves inwardly together with the slide plate to turn on the switch SW. The on and off action of the switch SW is detected by the CPU 31 which in turn judges whether or not the rotary key 10*j* is clicked down.

Figure 10A:
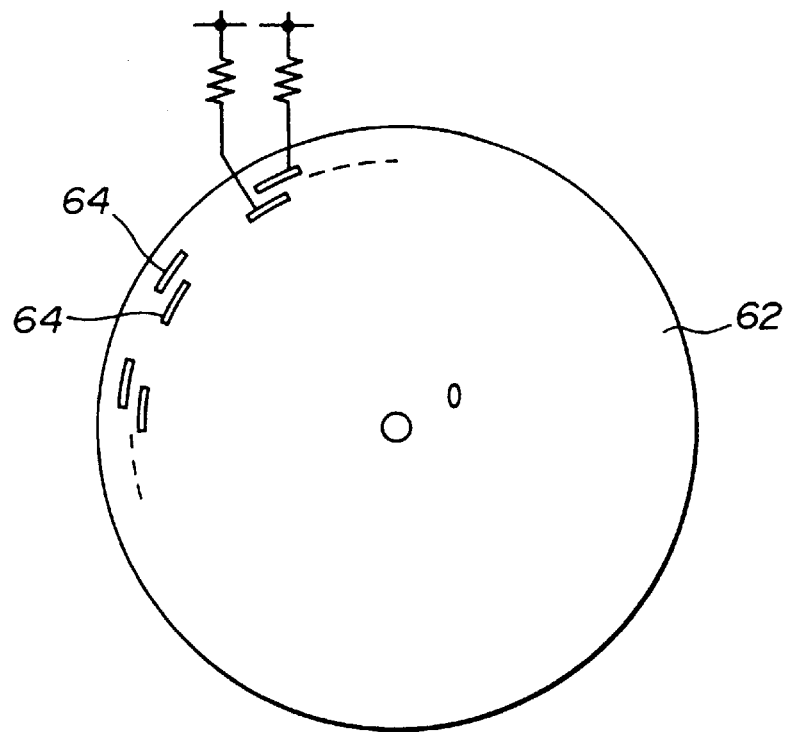
FIGS. 10(A) and 10(B) are plan views showing the construction of a rotary encoder.
Figure 10B:
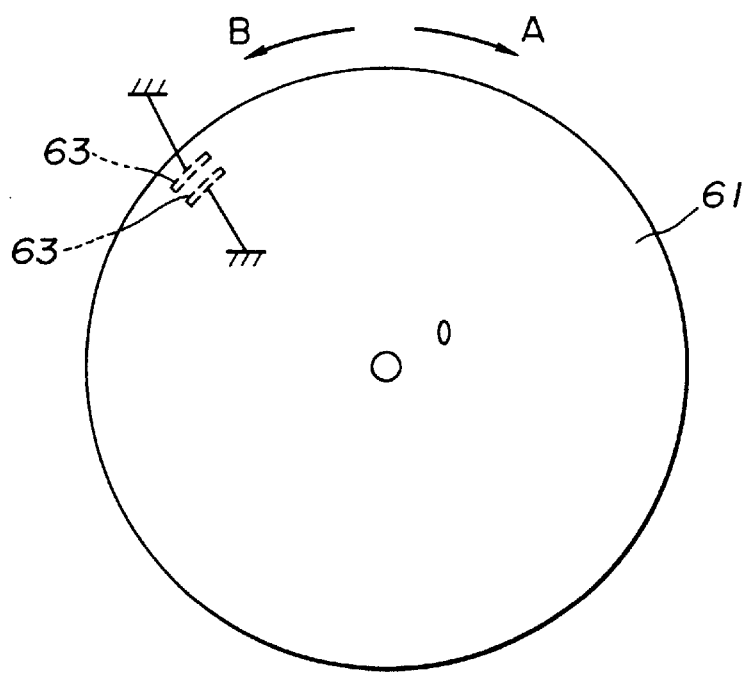

The rotary encoder movable along with the slide plate comprises, as shown in FIG. 10, two disks 61 and 62. The disk 61 is a rotating member mounted to the upper side of the other disk 62, which is fixedly mounted to the slide plate, so that the disk 61 can rotate relative to the disk 62. The rotatable disk 61 has two, inner and outer, contact electrodes 63 mounted to one side thereof. The contact electrodes 63 are designed to run directly along 20 pairs of stationary electrodes 64 mounted to the perimeter of the disk 62. Each pair of the inner and outer stationary electrodes 64 on the disk 62 are spaced radially and dislocated from each other circumferentially.

Figure 11A:
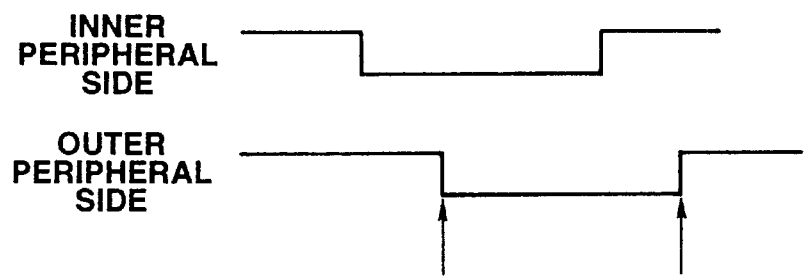
FIGS. 11(A) and 11(B) are waveform diagrams showing signal waveforms from the rotary encoder.
Figure 11B:
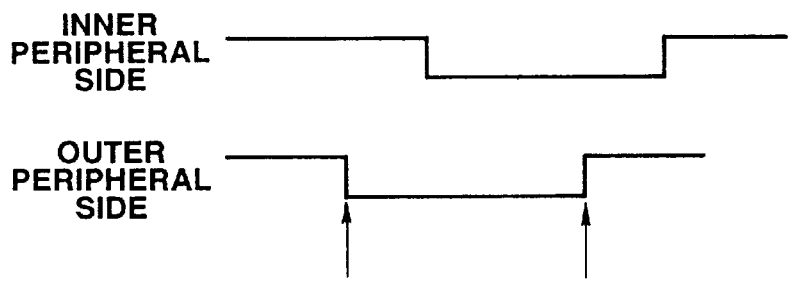

When the rotary key 10*j* is rotated in the C direction of FIG. 9, a potential at the inner electrode is declined earlier than that at the outer electrode as shown in FIG. 11(A). In reverse, when the rotary key 10*j* is turned in the D direction of FIG. 9, a potential at the outer electrode is decayed earlier than that at the inner electrode as shown in FIG. 11(B). By examining whether the inner or outer electrode has an earlier potential decay, the rotating direction of the rotary key 10*j* is determined. Also, the rotating distance of the rotary key 10*j* is measured by counting a number of output pulses from the outer electrode.

A typical control with the rotary key 10*j* will now be explained. With the menu screen being shown on the display 25, any of menu options can be selected as pointed with a cursor K which is moved upward and downward by the upward and downward rotating movements of the rotary key 10*j*. When the rotary key 10*j* is pressed inwardly (or clicked), an access to data of the option pointed by the cursor K is demanded to the CPU 31.

With the list of telephone numbers on the display 25, the pressing of the rotary key 10*j* for a predetermined period of time starts a call. During the call, the magnitude of a received sound can be controlled by rotating the rotary key 10*j*. If the rotary key 10*j* is clicked during the call, a muting function sets out to kill the received sound temporarily.

Figure 12:
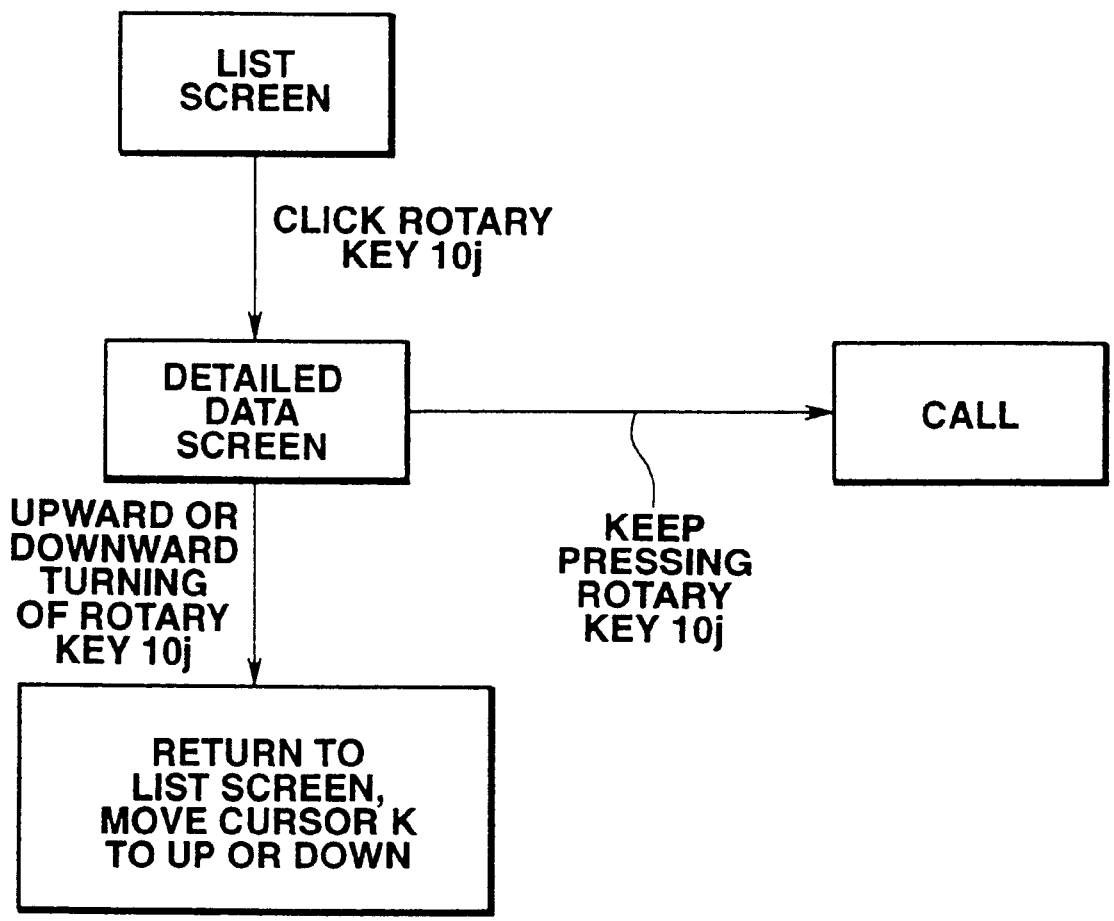
FIG. 12 is a series of illustrations explaining shift of a display screen with the rotary key.

FIG. 12 is a flow chart showing common steps of controlling with the rotary key 10*j*.

Upon a desired choice on the telephone number list or redialing screen being selected and clicked with the rotary key 10*j*, its detailed information appears on the display 25. After the rotary key 10*j* remains depressed for the period of time, a call to the telephone number pointed with the cursor K is automatically started. Recalling the previous display is done by turning the rotary key 10*j* upward or downward to locate the cursor K on the screen.

Figure 13:
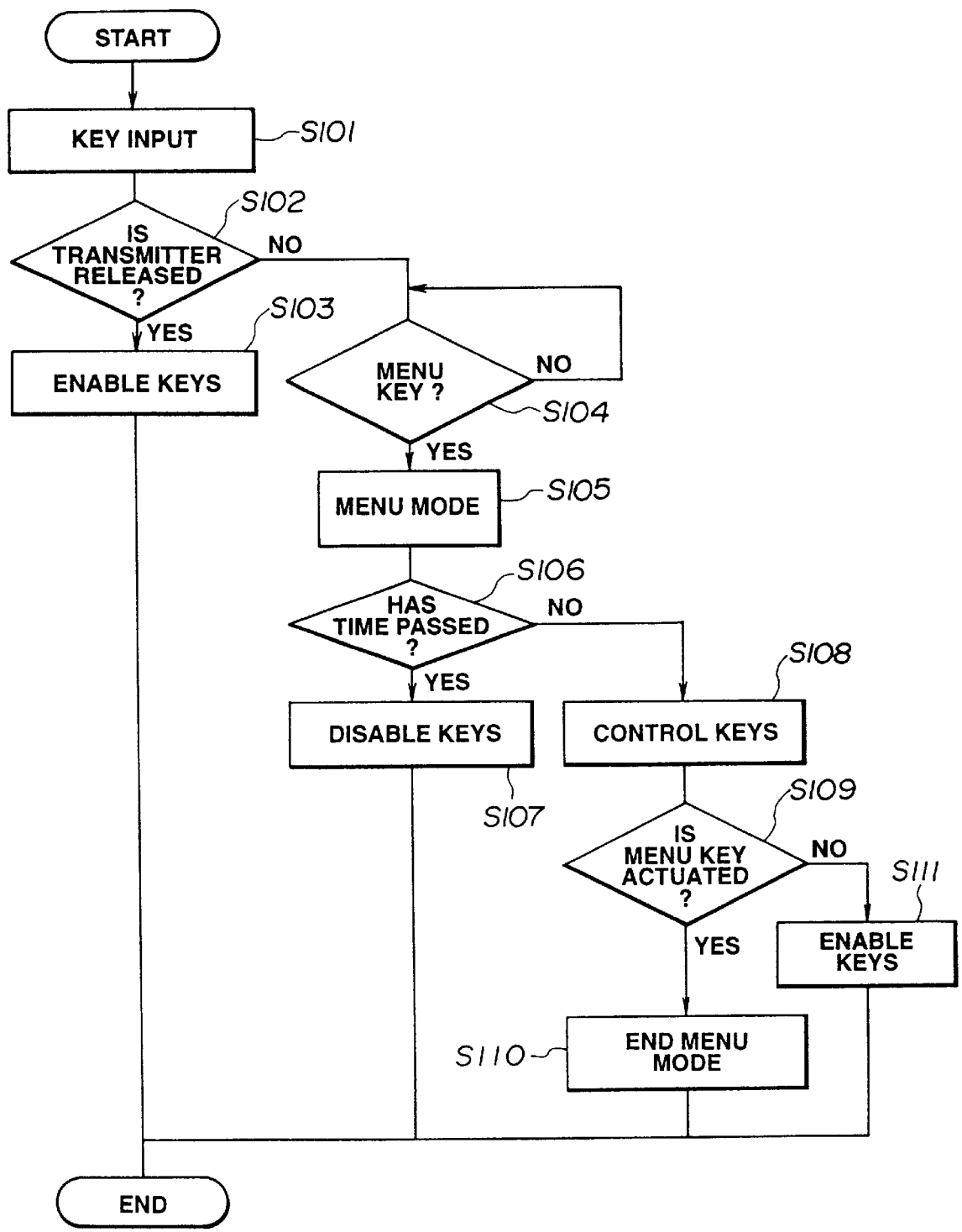
FIG. 13 is a flow chart showing steps of operation of an input control mechanism depending on the position of the transmitter.

The procedure of operation of the key control 10 including the keys 10*a* to 10*j* of which functions have been described above will be explained in more details referring to FIG. 13.

The procedure starts with switching on the power key 10*a* for energization of the terminal apparatus and entering the PIN data of a user. After a corresponding set of the keys 10*a* to 10*f* and 10*h* to 10*j* are actuated at Step S101, it is examined at Step S102 whether or not the transmitter 2 is at its call position as having been released from the holder 15 on the on-hook side of the main shell 1. If the detector 21 produces a yes detection signal indicating that transmitter 2 has been turned about the pivot support 14 in the A direction of FIG. 1 and is at its call position off the main shell 1, the procedure goes to Step S103 where the CPU 31 enables the operating keys 10*a* to 10*j*. As desired ones of the keys 10*a* to 10*j* are actuated by the user, their functions are executed. For example, pressing the menu key 10*g* changes the display 25 from the start screen to the menu screen. Also, by enabling and manipulating the rotary key 10*j*, a call to a desired telephone number can be made. Furthermore, an action of registering and editing telephone numbers on the telephone number list, described later, may be carried out using the numeral keys 10*b*.

When a no detection signal is released from the detector 21 at Step S102 which indicates that the transmitter 2 has been turned about the pivot support 14 in the B direction of FIG. 1 and is at its on-hook position in the holder 15 on the on-hook side of the main shell 1, the procedure moves to Step S104. It is then examined at Step S104 whether the menu key 10*g* is actuated or not. If not, the start screen is maintained and shown on the display 25. When it is judged that the menu key 10*g* is actuated, the procedure advances to Step S105 where the CPU 31 commands display of the menu screen on the display 25.

Then, the CPU 31 examines any key action during a period of time after the display of the menu screen at Step S106. If it is judged by the CPU 31 at Step S106 that non of the keys 10*a* to 10*j* is actuated for the period, the procedure goes to Step S107 where the CPU 31 disables the keys 10*a* and 10*j* and automatically shifts the display 25 from the menu screen to the start screen.

When one or more of the keys 10*a* to 10*j* are actuated during the period at Step S108, the procedure goes to Step S109 where it is examined by the CPU 31 whether the menu key 10*g* is actuated or not. If it is judged that the menu key 10*g* is actuated again, the CPU 31 closes the menu screen at Step S110 and displays the start screen on the display 25 inhibiting the action of the keys 10*a* to 10*f* and 10*h* and 10*j* while enabling the menu key 10*g*.

If it is judged by the CPU 31 at Step S109 that any other of the keys 10*a* to 10*f* and 10*h* to 10*j* than the menu key 10*g* is actuated, the procedure moves to Step S111. The CPU 31 allows at Step S111 the function of any of the keys 10*a* to 10*f* and 10*h* to 10*j* to be enabled. For instance, if the rotary key 10*j* is actuated, its function of making a call can be implemented.

Figure 14:
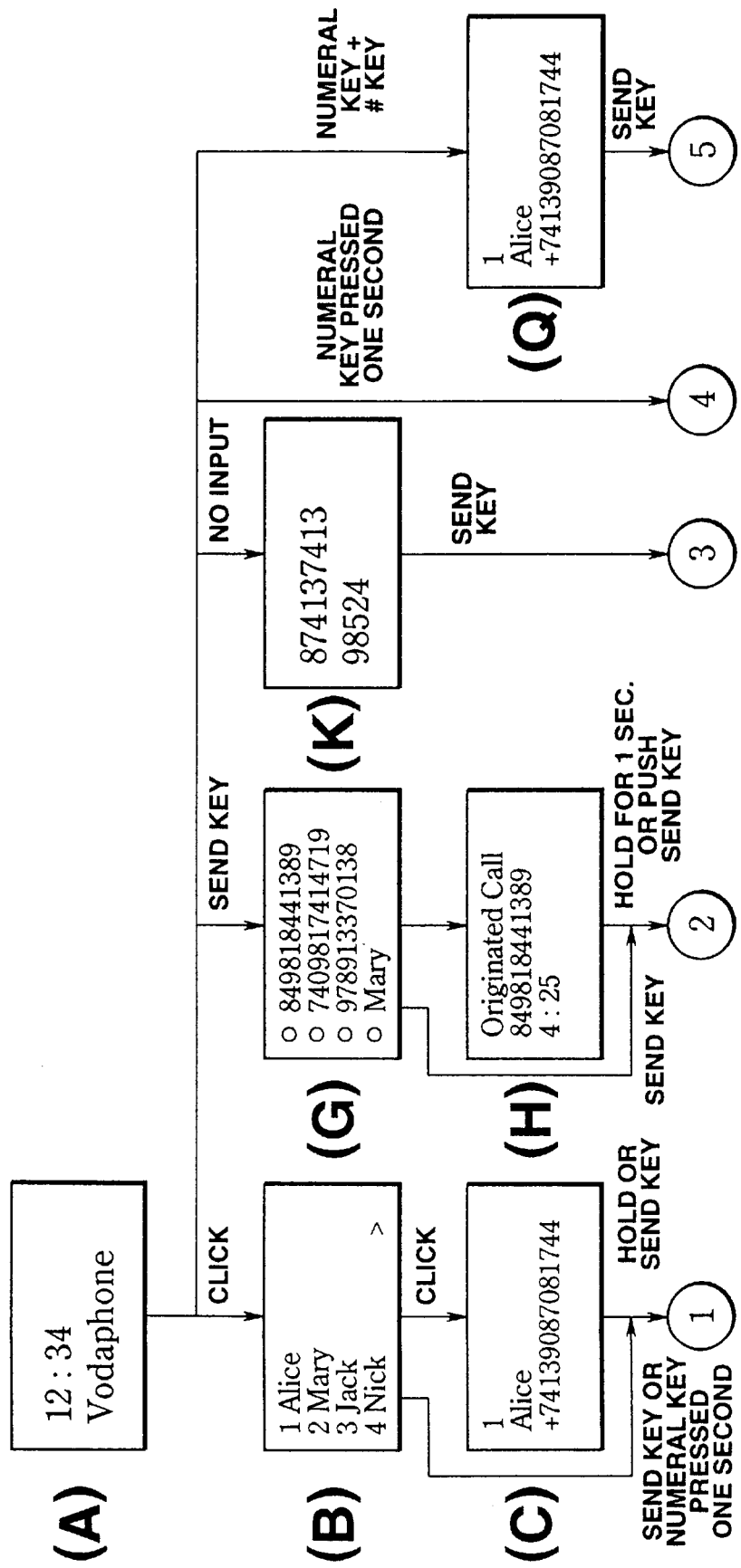
FIG. 14 is a series of illustrations showing steps of calling procedure.
Figure 15:
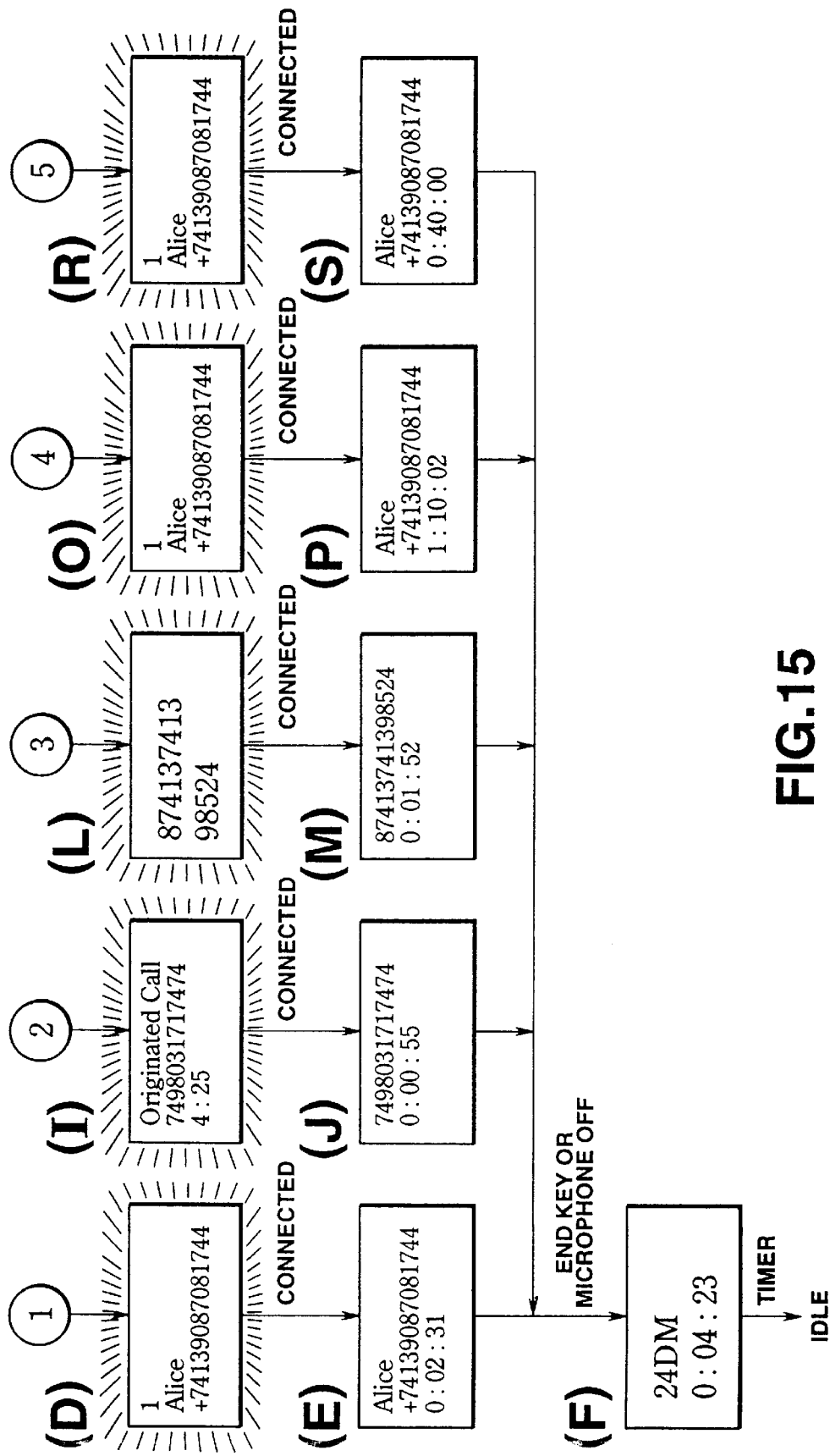
FIG. 15 is a series of illustrations showing steps of calling procedure.

As shown in FIGS. 14 and 15, the communication terminal apparatus of the present invention has five modes of transmission control which include mainly a mode of using the telephone number list, a mode of redialing, a mode of entering a telephone number directly, and a mode of using a one-touch speed dialing.

The mode of using the telephone number list will first be described.

Figure 16A:
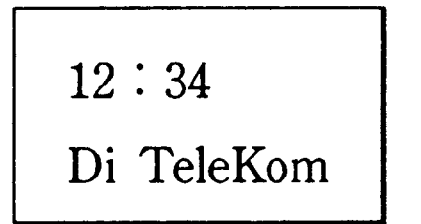
FIG. 16, consisting of parts 16(A), 16(B), 16(C), 16(D) and 16(E), is a series of illustrations showing steps of calling procedure with a telephone number list.
Figure 16B:
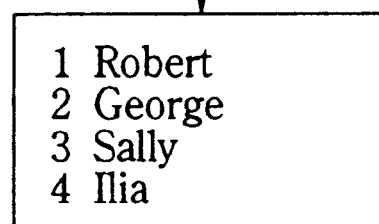

A call using the telephone number list starts with releasing the transmitter 2 from its on-hook position on the main shell 1 to locate its microphone 13 away from the main shell 1, or holding an external microphone connected to the main shell 1, or setting a hand-free kit connected to the main shell 1. Then, clicking of the rotary key 10*j* shifts the display 25 from the start screen such as shown in FIG. 16(A) to the telephone number list screen such as shown in FIG. 16(B).

The telephone number list comprises, as shown in FIG. 17, a frequent use column containing a group of names and their telephone numbers labeled 1 to 9 which may be used at higher frequencies, and an alphabetical order column containing all the registered names and their telephone numbers in an alphabetical order (including the names from 1 to 9 and their telephone numbers in the frequent use column).

Upon the display 25 shifting to and showing the telephone number list, the cursor K points out the first of options or an address number 1 of the list. As the rotary key 10*j* is turned downwardly in the D direction of FIG. 10, the cursor K moves from 1 to 2, 3, . . . . If the rotary key 10*j* is rotated upwardly in the C direction, the cursor K travels from bottom to Z, Y, X . . . .

With the rotary key 10*j* driving the cursor K to point out, an entry can be made through an address number or alphabetic name. Assuming that "1" and "9" of the numeral keys 10*b* are assigned to the nine address numbers respectively which represent a group of frequently usable telephone numbers, pressing a desired one of the keys 10*b* causes the cursor K to fly to and points out the corresponding address number on the screen. An example of this action is shown in FIG. 18.

When the display shows the alphabetical order list, the cursor K is moved to a desired name by hitting a corresponding one of the "1" to "9" numeral keys 10*b*. For example, when the "2" key 10*b* is pressed, the cursor K moves to the letter A on the screen. When the "3" key 10*b* is pressed, the cursor K moves to the letter D. If no name starting from D is found, the cursor K points out a name starting from E. If E is not found, the cursor K goes to a name starting from the next letter.

Figure 16C:
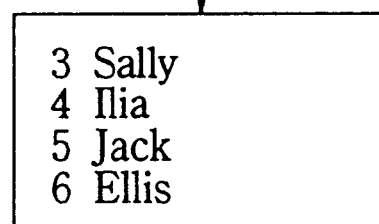

The following steps of the procedure will be explained referring to FIG. 16(C) where the cursor K is moved to a target name, Jack, labeled with the address number 5. As there are more than one methods following this step, use of the rotary key 10*j* is now selected.

Figure 16D:
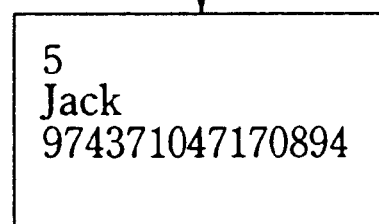
Figure 16E:
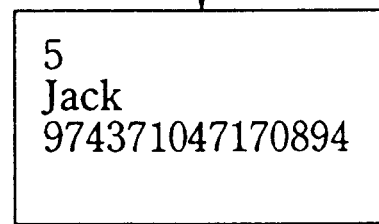

When the rotary key 10*j* is clicked on Jack, more detailed data appears on the display 25 as shown in FIG. 16(D) Then, depressing the rotary key 10*j* for one second starts a call to Jack. At the moment, the display 25 shows a flashing action as shown in FIG. 16(E).

If the name is desired to change on the detailed data screen of FIG. 16(D), the rotary key 10*j* is turned upwardly or downwardly in the C or D direction of FIG. 10. For example, the upward turning of the rotary key 10*j* in the C direction with the current screen such as shown in FIG. 19(B), the display turns back to the preceding screen. At the time, the cursor K is also shifted from the current option of the previous option. More specifically, the cursor K moves from the address number 5 for Ellis to the address number 4 for John in FIG. 19(C).

When the screen shown in FIG. 16(D) remains intact for a predetermined period of time, e,g, 30 seconds, it is judged that no call is wanted and then followed by closing the list of telephone numbers and returning to the start screen shown in FIG. 16(A). This automatic action prevents making of any unintentional call which may be triggered by accidental hitting of the key during transportation of the communication terminal apparatus in a case or bag, as will systematically be executed with the display showing a list.

For making a call from the telephone number list screen, the SEND key 10*e* may be used with the display shown in FIG. 16(D). As the call is made when the detailed data screen has been displayed in the above case, it may be commenced directly from the list screen according to a function of the embodiment. For example, pressing the SEND key 10*e* with the display shown in FIG. 16(C) can start a call to the person pointed with the cursor K. Also, pressing a desired one of the numeral keys 10*b* for one second produces a direct call.

The redialing mode will be explained referring to FIGS. 14(G) to 14(H). A redialing list opens when the SEND key 10*e* is pressed on the start screen. Hitting the SEND key 10*e* shifts the display from the start screen shown in FIG. 14(A) to the redialing list shown in FIG. 14(G) where a record of calls is viewed indicating transmitted telephone numbers and names. Selecting and calling a desired telephone number or name can be made directly from the redialing list by the same manner as with the prescribed list screen.

When no action is made for a predetermined period of time, e.g. 30 seconds, after the redialing list shown in FIG. 14(G) appears, it is judged that no call is wanted and the display returns to the start screen shown in FIG. 14(A). This prevents error calls which may be triggered by accidental pressing of the corresponding keys with the redialing list on the display during transportation of the communication terminal apparatus in a case or bag.

The communication terminal apparatus of the present invention may also have a function to indicate a time record of the previous call, as shown in FIG. 14(H) where the time record is 4:25, and a duration of the current call, as shown in FIG. 15(J) where the duration is 0:00:55.

The procedure of calling by entering a telephone number will be described.

A call is made by directly entering the telephone number of a receiver with the start screen shown in FIG. 14(A). As the display has changed from the start screen shown in FIG. 14(A) to a screen shown in FIG. 14(K), the telephone number is viewed in the large font. Then, the telephone number entered by the user and displayed is examined and if correct, the SEND key 10*e* is pressed. As the result, the screen shown is flashed at intervals such as shown in FIG. 15(L) starting transmission of a signal.

The procedure of calling by using a speed dialing will be explained.

Two modes are available in the procedure: pressing a corresponding one of the numeral keys 10*b* for a predetermined period of time and using a combination of the # key 10*c* and the numeral key 10*b*.

The former is shown in FIGS. 15(O) to 15(P) where the numeral key 10*b* only is used. When the user keeps depressing for e.g. one second the numeral key 10*b* representing a desired address number shown on the screen of FIG. 14(B), the display 25 is shifted to a corresponding detailed data screen shown in FIG. 14(C) starting a call.

The latter is shown in FIGS. 14(Q), 15(S), and 15(S) where both the numeral key 10*b* and the # key 10*c* are used.

When the user presses the numeral key 10b representing a desired address number shown on the screen of FIG. 14(B) and hits the # key 10c, the display 25 is shifted to a corresponding detailed data screen shown in FIG. 14(Q). Then, the call is started by pressing the SEND key 10e.

The call explained above is then intercepted by a person at the other end of the line carrying out an off-hook action (picking up a handset). This on-line state of the communication terminal apparatus will be described.

At the time, the communication terminal apparatus drives the detector mechanism 21 to examine whether the transmitter 2 is at the on-hook position on the main shell 1 or its microphone unit 13 is kept at the call position distanced from the main shell 1. The detection signal of the detector mechanism 21 is used for controlling the output of a voice signal from the microphone 13 or the input to the speaker 7.

During the call, when the transmitter 2 of the communication terminal apparatus is turned to its on-hook position and held in the holder 15 on the on-hook side of the main shell 1, the Hall device 22 of the detector mechanism 21 senses an intensity of magnetic flux from the magnetic material 23 of the transmitter 2 thus yielding a detection signal indicative of the presence of the transmitter 2 at the on-hook position. The detection signal is transmitted to the CPU 31 which in turn actuates the DSP 37 in the transmitter/receiver circuit 35. Accordingly, the DSP 37 controls the level of the voice signal of the microphone unit 13 to mute an input to the modulator/demodulator circuit 36. The presence of the transmitter 2 on its on-hook position causes the detector mechanism 21 to produce and transmit the detection signal to the CPU 31 which in turn drives the transmitter/receiver circuit 35 to mute the voice signal from the microphone unit 13. In this respect, the DSP 37 also serves a means for muting the voice output from the transmitter 2 and the voice input to the speaker 7.

While the CPU 31 in response to the detection signal from the detector mechanism 21 indicative of the presence of the transmitter 2 at its on-hook position mutes the voice signal transmitted from the microphone unit 13 to the transmitter/receiver circuit 35 during the communication, it drives the DSP 37 to generate a hold signal. The hold signal is fed to the modulator/demodulator circuit 36 for modulation and sent out through the antenna 8. As explained, the hold signal is generated and transmitted upon the voice output of the microphone unit 13 being muted so that it can inform the calling party that the line remains connected.

Also, the CPU 31 in responsive to the detection signal from the detector mechanism 21 indicative of the presence of the transmitter 2 at its on-hook position can instruct the amplifier circuit of the DSP 37, which amplifies the voice input to the speaker 7, to mute an audible sound from the speaker 7.

The transmission of the hold signal may be canceled as desired, even when the voice signal from the microphone unit 13 to the transmitter/receiver circuit 35 has been muted. For selecting transmission or non-transmission of the hold signal, any of the operating keys 10a to 10j of the input control mechanism 10 is designated as a dedicated selector switch.

When the transmitter 2 is turned about the pivot support 14 in the direction A shown in FIG. 1 to the call position with the microphone 13 mounted to the distal end of its arm 12 spaced away from the main shell 1 during the communication but with either the voice output from the microphone 13 or the voice input to the speaker 7 being muted, its magnetic material 23 departs from the Hall device 22 which becomes disable to detect the magnetic flux of the magnetic material 23. Accordingly, the detector mechanism 21 produces and transmits a detection signal indicative of the removal of the transmitter 2 from the main shell 1. The absence detection signal is then fed to the CPU 31 which in turn cancels the muting of the voice output from the microphone unit 13 or the voice input to the speaker 7. As the result, the voice signal from the microphone unit 13 is further transmitted through the antenna 8 and the voice input to the speaker 7 is converted to an audible sound.

The communication terminal apparatus of the present invention is provided with a muting function for muting the voice output from the microphone unit 13 or the voice input to the speaker 7 upon the transmitter 2 being turned back to its on-hook position.

The procedure of registering and editing a telephone number or name on the telephone number list in the communication terminal apparatus will be explained.

The procedure starts with pressing the menu key 10g to open the menu screen and selecting an option of Telbook Edit. There are two different manners of registering. A first manner consists of selecting an option of New Register and entering a telephone number to be registered. The cursor K is moved to New Register by the user operating the rotary key 10j and clicked (See FIG. 20(B)).

Then, the display turns to a screen shown in FIG. 20(C) and entry of a desired name to be registered is demanded. When a set of the numeral keys 10b are pressed, corresponding alphabetical letters of the large font appear in the screen. If the letters in the screen is correct, they are registered by clicking the rotary key 10j and the display moves to a screen for registering a telephone number. The telephone numbers are then entered and registered by controlling the rotary key 10j. As the result, the name and telephone number are newly loaded in a vacant row of the telephone number list as shown in FIG. 20(D).

Figure 21A:
FIG. 21, consisting of parts 21(A), 21(B), 21(C), 21(D), and 21(E), is a series of illustrations showing another procedure of registering a name in the telephone number list screen.
Figure 21B:
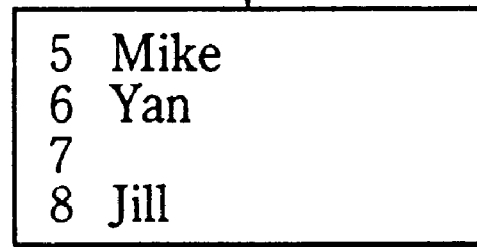
Figure 21C:
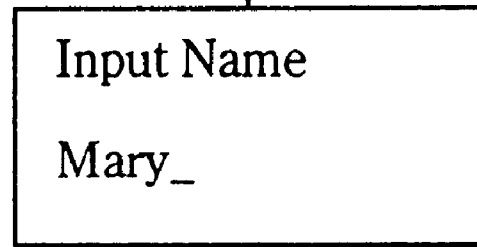

A second manner consists of selecting an unused address number and registering a desired name for the number. The cursor K is first moved to the unused address number as shown in FIGS. 21(A) and 21(B) where the number is 7. Then, clicking of the rotary key 10j causes the display 25 to demand entry of the name.

Figure 21D:
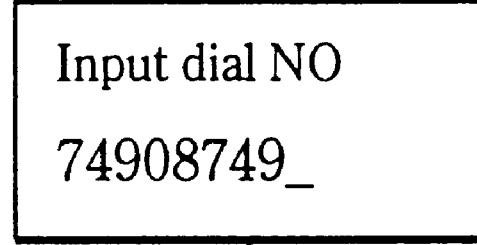
Figure 21E:

This is followed by the same steps as of the first manner for entering the name with a set of the numeral keys 10b and registering it by clicking the rotary key 10j. A corresponding telephone number is then entered by following an instruction message as shown in FIG. 21(D) before registering with the rotary key 10j. The procedure of registering is now completed.

The procedure of editing starts with locating the cursor K to a name to be edited and clicking the rotary key 10j. The editing mode screen appears upon accessing the name or choice which has been registered. The editing mode screen has several options including Edit, Delete, and Swap while showing the name accessed. The user can select any of the options on the screen using the rotary key 10j.

For example, when Delete is selected, the display 25 turns to a screen shown in FIG. 23(D) where it is questioned if you are sure to delete. If yes is selected, the action of Delete is done.

Figure 22:
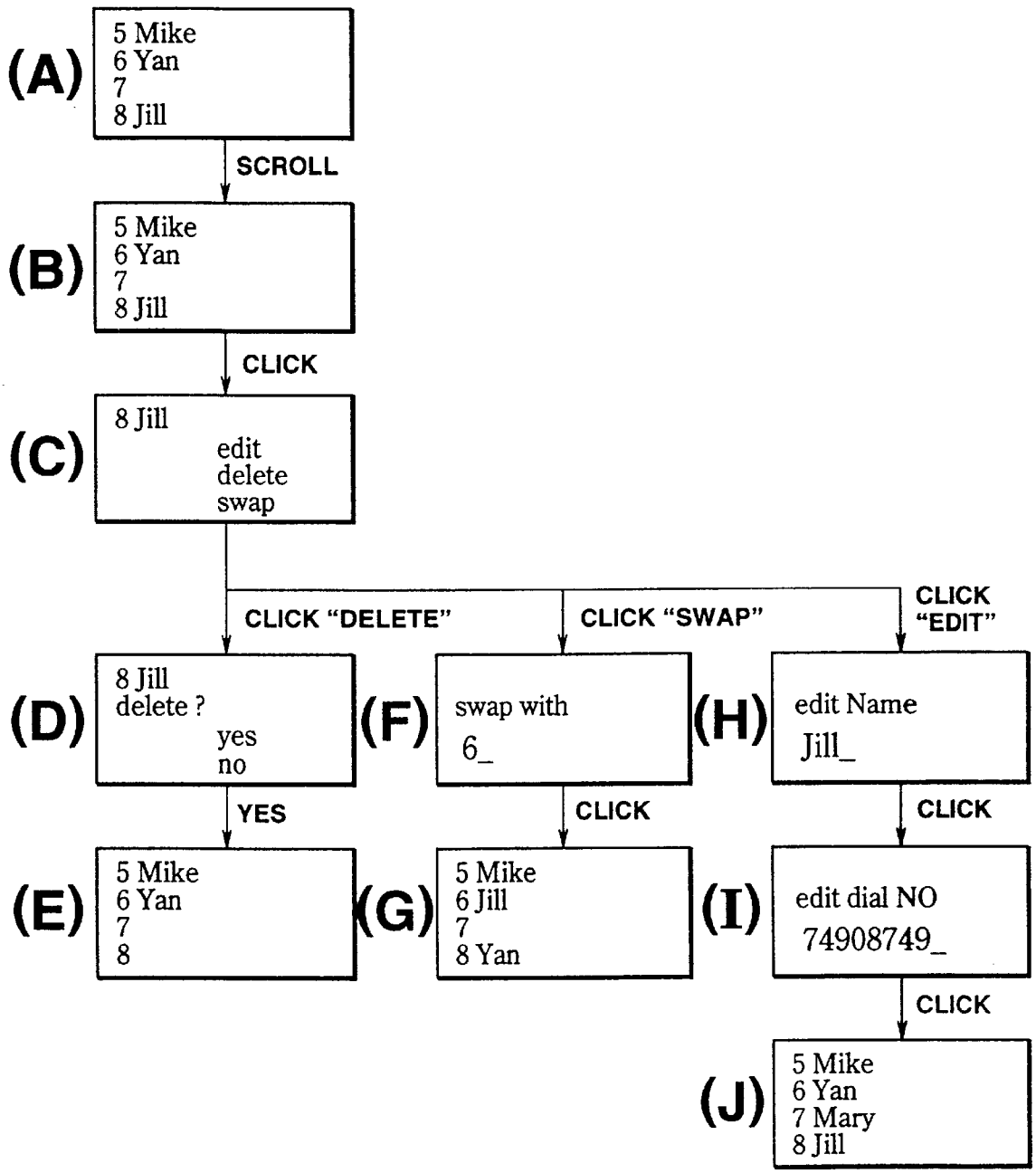
FIG. 22 is a series of illustrations showing a procedure of editing options in the telephone number list screen.

When Swap is chosen, the display 25 shifts to a screen shown in FIG. 22(F), demanding entry of a target address number to be swapped with. As the address number is typed and clicked with the rotary key 10j, the swapping is done. A resultant screen is shown in FIG. 22(G) where 8 is replaced by 6.

When Edit is selected, both the name and telephone number to be edited are indicated on their respective screens shown in FIGS. 22(H) and 22(I). After the editing is done with clicking the rotary key 10j, the display turns to a screen shown in FIG. 22(J).

Figure 23:
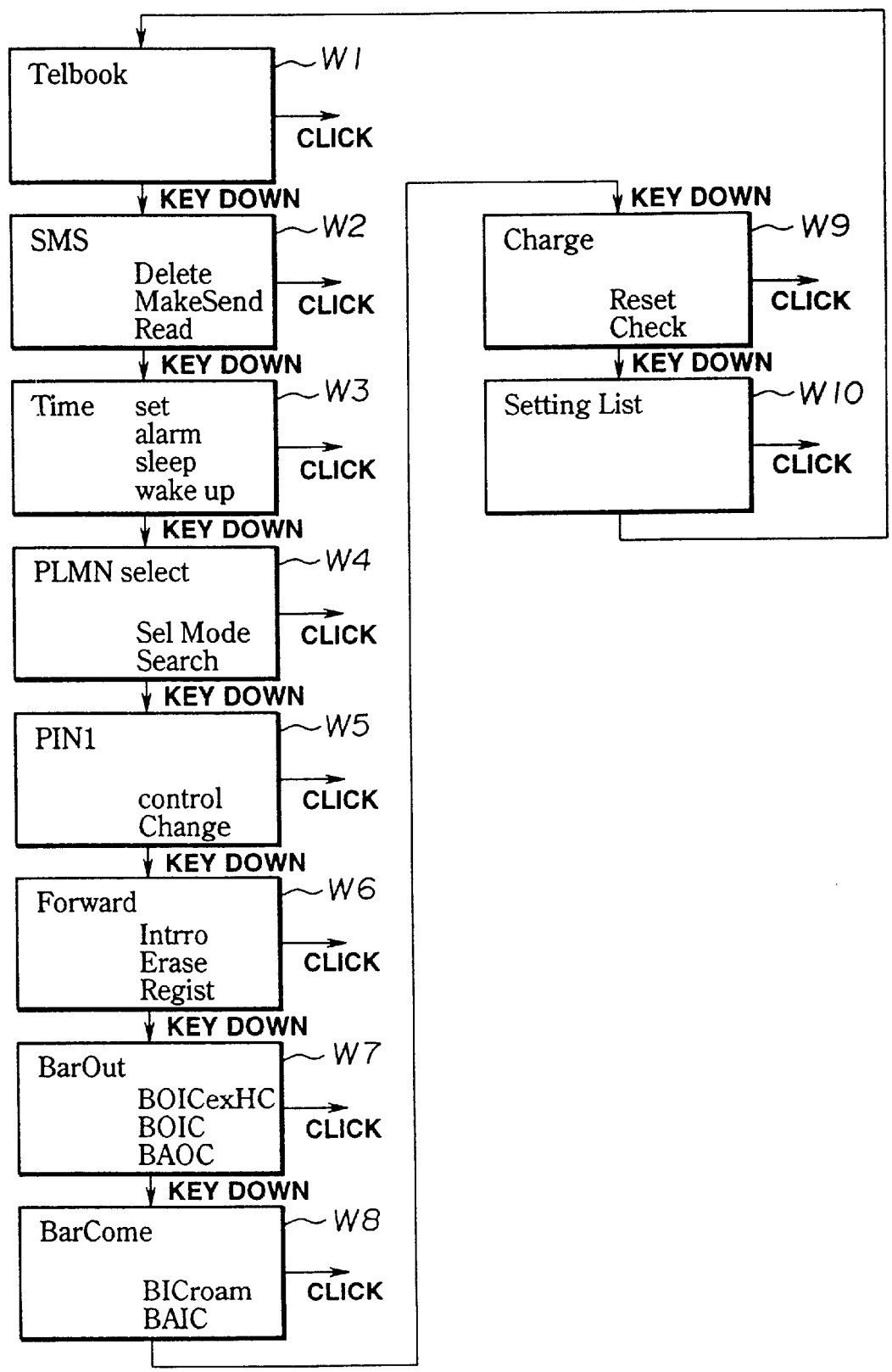
FIG. 23 is a series of illustrations showing menu screens.

The menu mode displayed on the display 25 by hitting the menu key 10g of the key control 10 will be explained. The menu mode comprises a group of main screens and their subscreens which can be retrieved by operating the rotary key 10j. FIG. 23 illustrates the main screens, W1 to W10, installed in the communication terminal apparatus of the embodiment. The menu subscreens are shown in FIGS. 24 t 27.

Figures 24A, 24B:
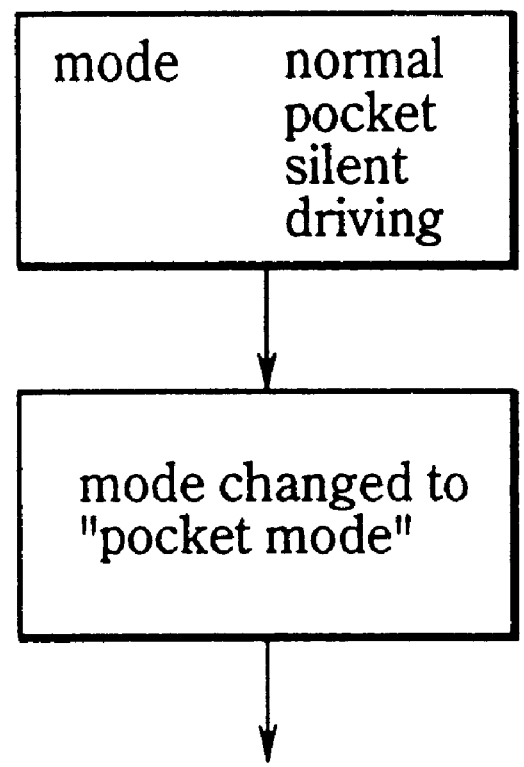
FIG. 24, consisting of parts 24(A) and 24(B), is a series of illustrations showing a detailed data screen for mode setting.

The first main screen W1 has two options, Telbook for accessing to the telephone number list and Mode for setting a mode. Telbook provides registering a new dial number list and editing the telephone number list. When Mode is selected, the display changes to a Mode screen shown in FIG. 24(A) where several setting options are displayed for optimum environment. The screen of FIG. 24(A) shows four mode options of Normal, Pocket, Silent, and Driving.

In Pocket mode, for example, a ringer is switched on for maximum ringing and the key lock is turned on. This allows the user to hardly miss a ringing sound under noisy conditions and to avoid unwanted key actions.

Silence mode causes the ringer to switch off and allows the display 25 to flash indicating reception of a call. For example, the user can acknowledge an incoming call without disturbing people around in a crowded commute train. Also, this mode provides an extra function of automatically disconnecting a call when no answer is made.

In Driving mode, an answer can be made without any key action upon receiving a call.

The second main screen W2 is designed for setting a short message (SMS) and displays three options: Delete, Make Send, and Read. When Make Send is selected, the display moves to subscreens for writing a new message to be transmitted, using an original pattern message, and retrieving a recorded message which has been transmitted or received.

Selection of Read is followed by a subscreen for storing or deleting a read message, or replying by phone or with a short message.

The third main screen W3 is provided for setting a time (Time) and has four options: Set for setting a time, Alarm for setting an alarm time, Sleep for setting an OFF time, and Wake up for setting an ON time.

The fourth main screen W4 is designed for setting a public lie-dit mobile network (PLMN) and has two options: Sel Mode (selection mode) and Search. The former is selected for setting a network by a manual mode or an automatic mode. The latter is used for automatically searching and displaying an available network.

The fifth main screen W5 is provided for setting a personal identification number (PIN) and displays two options: Control and Change. The former is used for determining entry of an ID number as an initial requirement to limit the use to eligible personals. The latter is selected for changing an ID number.

The sixth main screen W6 is provided for setting a forwarding action (Forward) and has three options: Intrro (interrogation), Erase, and Regist (registration). Intrro is selected for interrogating a forwarding service to the network. Erase and Regist are used for erasing and registering a forwarding target respectively.

The seventh main screen W7 is designed for setting a barring of outgoing calls (BarOut) and has three options: BOIC-exHC (barring of outgoing international calls except those directed to the HPLMN country), BOIC (barring of outgoing international calls), and BAOC (barring of all outgoing calls). Any option will be selected for determining a desired mode of the setting.

The eighth main screen W8 is provided for setting a barring of incoming calls (BarCome) and has two options: BICroam (barring of incoming calls in roaming except those from the PLMN country) and BAIC (barring of all incoming calls). Either option will be selected for determining a desired mode of the setting.

The ninth main screen W9 is provided for setting a charge data and displays two options: Reset and Check. The former is selected for resetting the charge data while the latter is used for displaying the charge data.

Figure 25:
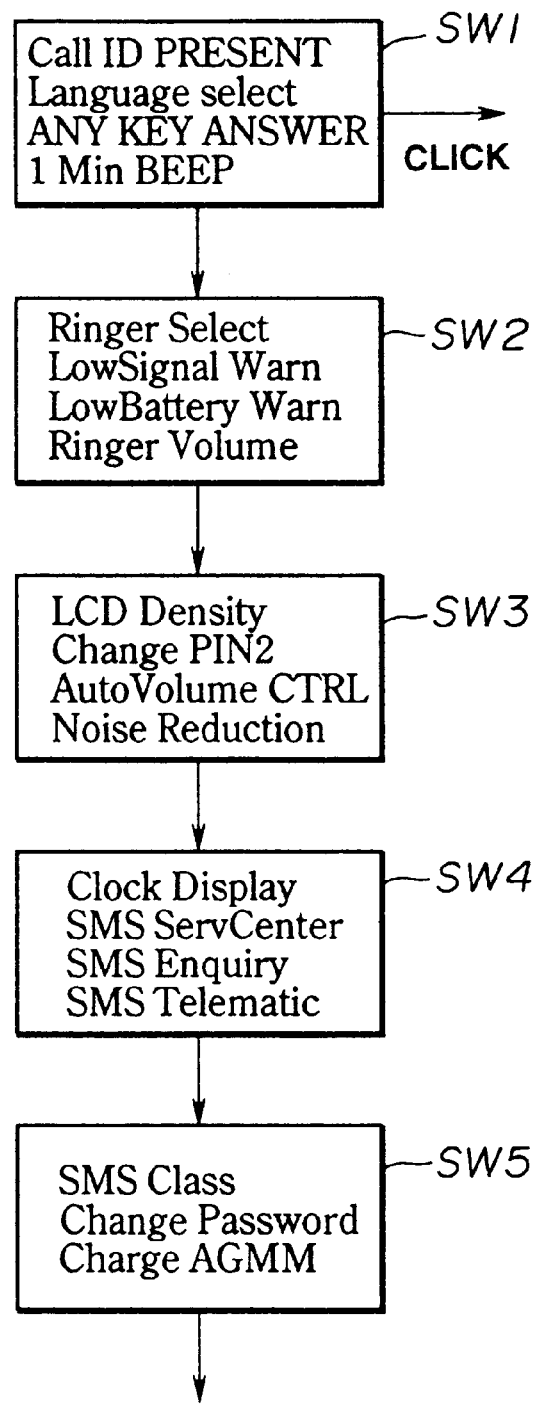
FIG. 25 is a series of illustrations showing mode setting screens.

The tenth main screen W10 is designed for accessing a setting list (Setting List) and contains five subscreens shown in FIG. 25. Through scrolling down, the tenth screen is shifted to the first main screen W1.

The five subscreens of the tenth menu W10 are now explained starting with a first subscreen SW1 which displays four options: Call ID Present, Language Select, Any Key Answer, and 1 Min Beep. Call ID Present is used for forwarding the telephone number of the transmitter to a receiver. Any Key Answer is for allowing any key to start an answer. 1 Min Beep is selected for emitting a beep sound at every one minute to indicate consumption of time.

Figures 26A, 26B:
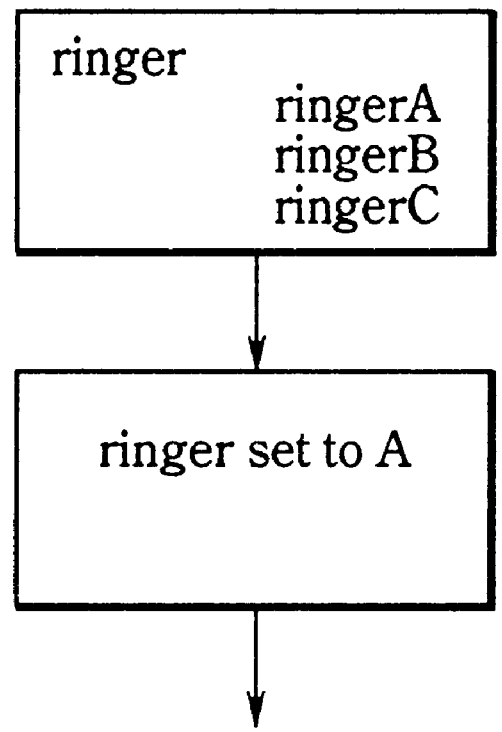
FIG. 26, consisting of parts 26(A) and 26(B), is a series of illustrations showing a detailed data screen for ringer setting.

A second subscreen SW2 contains four option: Ringer Select, LowSignal Warn, LowBattery Warn, and Ringer Volume. When Ringer Select is clicked, three ringer options are displayed as shown in FIG. 26 and from which one is selected. Ringer Volume allows selection of a desired volume from three different levels shown in FIG. 26.

A third subscreen SW3 has four options: LCD Density for determining the intensity of light on LCD, Change PIN2 for modifying a personal ID number, AutoVolume CTRL for increasing a sound automatically when background noise is high, and Noise Reduction.

A fourth subscreen SW4 on the display 25 displays four options: Clock Display for indicating a time, SMS Serv-Center for changing the address of a service center, SMS Enquiry for indicating the receipt of a short message at a receiver, and SMS Telmatic for sending a short message to a facsimile.

A fifth subscreen SW5 provides three options: SMS Class for weighting a short message depending on its significance, Change Password for modifying a password which controls calls with its extra service allowance, and Charge ACMM for limiting the number of calls to an upper limit.

Figure 28:
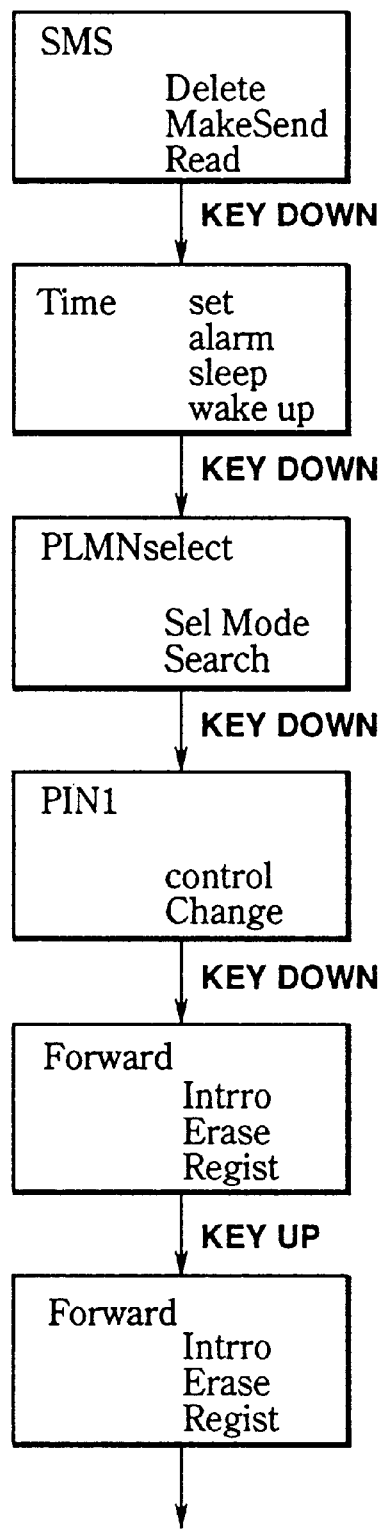
FIG. 28 is a series of illustrations explaining a scroll action.
Figure 29:
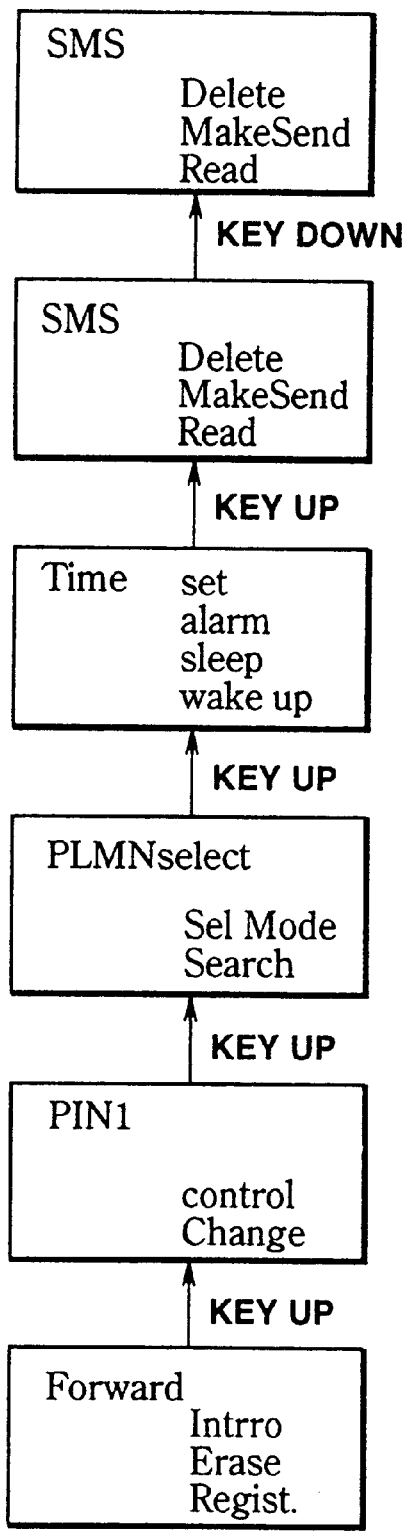
FIG. 29 is a series of illustrations explaining a scroll action.

The scrolling on the display 25 of the communication terminal apparatus for high-speed paging of the main screens or subscreens in one mode will be described referring to FIGS. 28 and 29.

When the cursor K is moved upward from the top of options in the current screen, the display shifts from the current screen to the preceding screen with the cursor K appearing at the top of options. Also, if the cursor K is moved downward from the bottom of options in the current screen, the display shifts from the current screen to the succeeding screen with the cursor K locating at the bottom of options.

This scrolling action allows the cursor K to be quickly moved from one screen to another.

Although the foregoing functions are conducted with the rotary key 10*j* which serves as an input device for locating the cursor K and selecting options through rotating and clicking actions, any other device having two discrete controls for locating the cursor and selecting options respectively will be used with equal success.

For example, a turnable control key may be used of which movement is limited to a given angle. It is also possible to employ a slidable control lever or a track ball with a click control. A slide switch with a click control may be utilized. Any of them is applicable to the embodiment thus providing a communication terminal apparatus which has a minimum number of keys and is improved in the portability.

The upward and downward movements of the rotary key 10*j* is not limited to driving the cursor K upward and downward as described in the embodiment, but may be assigned to leftward and rightward movements of the cursor K.

Figure 30:
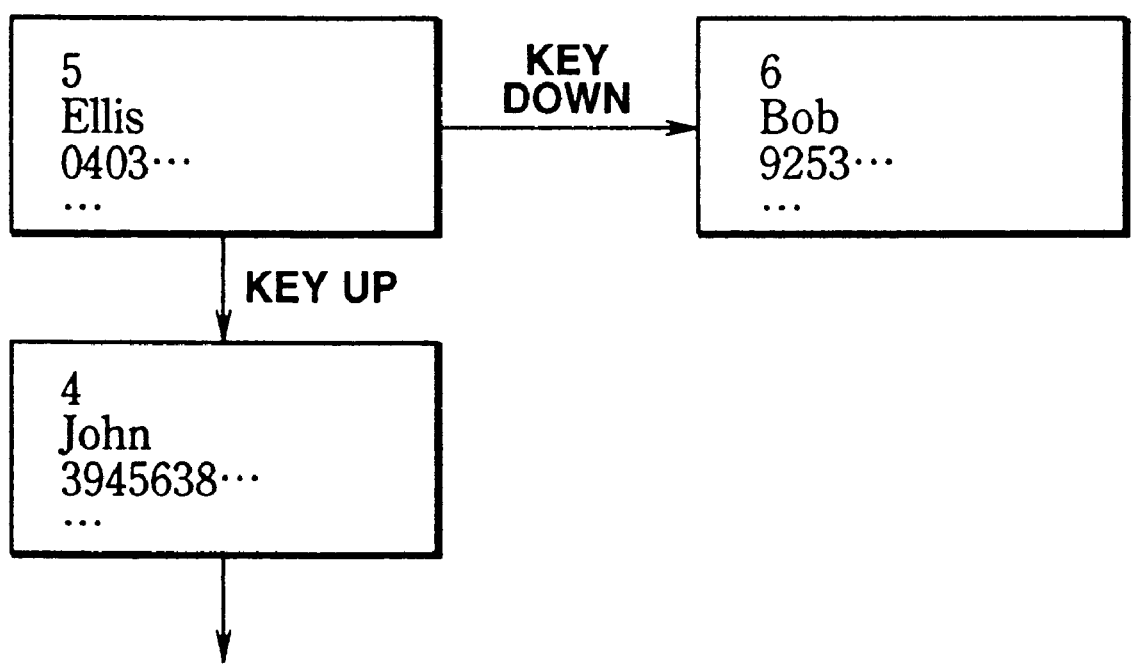
FIG. 30 is a series of illustrations explaining shift of a detailed data screen to another screen.

In the embodiment, when the rotary key 10*j* is turned upwards with the detailed data screen of the telephone number list mode, the display is shifted back to the menu or telephone number list screen with the cursor K appearing on the name of which detailed data has been displayed. However, it may be modified, as shown in FIG. 30, to move to a detailed data screen of the preceding name in the list when the rotary key 10*j* being turned upward and to a detailed data screen of the following name of the list when turned downward. In this case, returning to the menu screen can be executed with the clear key 10*h*.

Although the telephone number list in the embodiment consists of alphabetical letters, it may be written in Japanese Katakanas.

According to the embodiment, the shifting from the ordering of names by frequency in the telephone number list to the alphabetical order is made using the rotary key 10*j*. This shifting action may be carried out with a specific shift key or a combination with any of the existing front side keys, e.g. the # key 10*c*.

Although characters on the display 25 of the embodiment are expressed by the two, large and small, fonts, they may comprise three, large, small, and medium, fonts.

The ID cards for storage of administration data for subscribers are not limited to the SIM cards in the embodiment but any other stipulated cards may be used.

In the embodiment, the cursor K is jumped from the top of the current screen to the top of the preceding screen by the scrolling control and from the bottom of the current screen to the bottom of the following screen. The scrolling control may be enabled for shifting the cursor K either from the top of the current screen to the top of the preceding screen or from the bottom of the current screen to the bottom of the following screen.

Also, it is a good idea to allow jumping of the cursor K from any location in the current screen to the following screen by the downward control and shifting of the cursor K from one option to the other located above by the upward control. Possibly, jumping of the cursor K from any location in the current screen to the preceding screen may be triggered by the upward control, and shifting of the cursor K from one option to the other located below may be executed by the downward control.

Industrial Applications

The communication terminal apparatus according to the present invention allows the movement of the transmitter, which has a microphone unit therein acting as a speech input device and is arranged movable relative to the main shell, to be used for controlling the muting of voice signals on the transmitter and speaker. Hence, no extra key for triggering a muting function is needed. The communication terminal apparatus is capable of performing multi-function operations with the use of a smaller number of keys, thus decreasing its overall size and weight.

The voice signals on the transmitter and speaker are muted selectively during communications to prevent emission or transmission of an unwanted sound, whereby the convenience in signal transmission and receiving will be improved.

The muting of the voice signals on the transmitter and speaker is selectively implemented by the movement of the transmitter and will be improved in the controllability. Also, the muting state is recognized by viewing the transmitter at its on-hook position and its fault involvement will be avoided.

As the hold signal is generated and transmitted upon the muting action, it informs a person at the other end of the line that the line remains connected, thus preventing communication error.

What is claimed is:

1. A telephone terminal apparatus comprising:
   speech input means movable between a position adjacent to a main shell and a position distanced from the main shell for calling;
   speech output means for reproducing a received signal as an audible sound;
   detector means for detecting a position of the speech input means and producing a detection signal;
   controller means responsive to the detection signal from the detector means for effecting control of muting means included in the controller means to perform a muting operation on a telephonic voice signal based on the position of the speech input means detected by the detector means; and
   means for generating a hold signal in response to the muting operation of the muting means.

2. A telephone terminal apparatus according to claim 1, wherein the muting means performs the muting operation when the detection signal from the detector means indicates that the speech input means is located at the position adjacent to the main shell.

3. A telephone terminal apparatus according to claim 1, wherein the speech input means comprises an arm pivotably mounted to the main shell for movement between an on-hook position adjacent to the main shell and a call position distanced from the main shell, and a microphone unit mounted to the arm.

4. A telephone terminal apparatus according to claim 3, wherein the detector means comprises a detection target mounted to one of the arm of the speech input means and the main shell, and a detector mounted to the other of the arm of the speech input means and the main shell.

5. A telephone terminal apparatus according to claim 3, wherein the detector means comprises a detection target mounted to one of the arm of the speech input means and the main shell, and a detector mounted to the other of the arm and the main shell.

6. A telephone terminal apparatus according to claim 4 wherein the detection target is a magnet and the detector is a Hall device.

7. A telephone terminal apparatus comprising:
   speech input means movable between a position adjacent to a main shell and a position distanced from the main shell for calling;

speech output means for reproducing a received signal as an audible sound;

detector means for detecting a position of the speech input means and producing a detection signal;

controller means responsive to the detection signal from the detector means for effecting control of muting means included in the controller means to perform a muting operation on a telephonic voice signal based on the position of the speech input means detected by the detector means; and means for generating a hold signal in response to the muting operation of the muting means.

8. A telephone terminal apparatus comprising:

speech input means movable between a position adjacent to a main shell and a position distanced from the main shell for calling;

speech output means for reproducing a received signal as an audible sound;

detector means for detecting a position of the speech input means and producing a detection signal;

controller means responsive to the detection signal from the detector means for effecting control of muting means included in the controller means to perform a muting operation on a telephonic voice signal when the detector means detects that the speech input means is located adjacent to the main shell; and means for generating a hold signal in response to the muting operation of the muting means and for transmitting the hold signal to a calling party.

9. A telephone terminal apparatus comprising:

a microphone module movable between an on-hook position adjacent to a main shell and a call position distanced from the main shell;

transmitter/receiver means for modulating and transmitting an output signal from the microphone module, and for demodulating and reproducing an input signal;

a speaker module for emitting an audible sound corresponding to a demodulated input signal from the transmitter/receiver means;

detector means for detecting a position of the microphone module and producing a detection signal; and controller means responsive to the detection signal from the detector means for effecting control of muting means included in the controller means to perform a muting operation on a telephonic voice signal based on the position of the microphone module detected by the detector means; and means for generating a hold signal in response to the muting operation of the muting means and for transmitting the hold signal to the transmitter/receiver means in order to be transmitted by the transmitter/receiver means.

10. A telephone terminal apparatus according to claim 9, wherein the muting means mutes an output signal from the microphone module when the detector detects that the microphone module is located at the on-hook position.

11. A telephone terminal apparatus according to claim 9, wherein the microphone module comprises an arm and a microphone unit, the arm having a proximal end and a distal end, the proximal end being pivotably mounted to the main shell and the microphone unit being mounted to the distal end of the arm.

12. A telephone terminal apparatus comprising:

a microphone module movable between an on-hook position adjacent to a main shell and a call position distanced from the main shell;

transmitter/receiver means for modulating and transmitting an output signal from the microphone module, and for demodulating and reproducing an input signal;

a speaker module for emitting an audible sound corresponding to a demodulated input signal from the transmitter/receiver means;

detector means for detecting a position of the microphone module and producing a detection signal;

controller means responsive to the detection signal from the detector means for effecting control of muting means included in the controller means to perform a muting operation on a telephonic voice signal based on the position of the microphone module detected by the detector means; and means for generating a hold signal in response to the muting operation of the muting means, and for transmitting the hold signal to the transmitter/receiver means in order to be transmitted by the transmitter/receiver means.

* * * * *